United States Patent
Cai et al.

(10) Patent No.: US 11,337,200 B2
(45) Date of Patent: May 17, 2022

(54) PHYSICAL DOWNLINK CONTROL CHANNEL PROCESSING METHOD AND RELATED DEVICE

(71) Applicant: HUAWEI TECHNOLOGIES CO., LTD., Guangdong (CN)

(72) Inventors: Yu Cai, Beijing (CN); Yongbo Zeng, Beijing (CN); Da Wang, Shenzhen (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 16/651,603

(22) PCT Filed: May 16, 2018

(86) PCT No.: PCT/CN2018/087181
§ 371 (c)(1),
(2) Date: Mar. 27, 2020

(87) PCT Pub. No.: WO2019/062149
PCT Pub. Date: Apr. 4, 2019

(65) Prior Publication Data
US 2020/0288444 A1  Sep. 10, 2020

(30) Foreign Application Priority Data
Sep. 29, 2017  (CN) .......................... 201710911805.5

(51) Int. Cl.
*H04W 72/04* (2009.01)
*H04W 72/12* (2009.01)

(52) U.S. Cl.
CPC ..... *H04W 72/042* (2013.01); *H04W 72/1278* (2013.01)

(58) Field of Classification Search
CPC .......................... H04W 72/042; H04W 72/1278
See application file for complete search history.

(56) References Cited

U.S. PATENT DOCUMENTS

| 2011/0274031 A1 | 11/2011 | Gaal et al. |
| 2012/0093063 A1 | 4/2012 | Yuan et al. |

(Continued)

FOREIGN PATENT DOCUMENTS

| CN | 102362457 A | 2/2012 |
| CN | 102844994 A | 12/2012 |

(Continued)

OTHER PUBLICATIONS

Office Action dated Oct. 28, 2020, issued in CN Application No. 201710911805.5, total 10 pages.
(Continued)

*Primary Examiner* — Duc C Ho

(57) ABSTRACT

This application provides a physical downlink control channel processing method and a related device. In the method, a search space may be determined based on a first radio network temporary identifier, where the search space is a set of M candidate physical downlink control channels; and a target physical downlink control channel is detected from the search space based on a second radio network temporary identifier, where the first radio network temporary identifier is a radio network temporary identifier of a first device or a second device, the second radio network temporary identifier is the radio network temporary identifier of the second device, first downlink control information carried by the target physical downlink control channel is information that is scrambled by using the second radio network temporary identifier and that is used to schedule the second device, and the second device communicates with a network by using the first device.

20 Claims, 7 Drawing Sheets

---

A first device determines a search space based on a first radio network temporary identifier, where the search space is a set of M candidate physical downlink control channels, and M is an integer greater than or equal to 1  — S101

The first device detects a target physical downlink control channel from the search space based on a second radio network temporary identifier, where first downlink control information carried by the target physical downlink control channel is information that is scrambled by using the second radio network temporary identifier and that is used to schedule a second device, and the second device communicates with a network by using the first device  — S102

(56) References Cited

U.S. PATENT DOCUMENTS

| | | | |
|---|---|---|---|
| 2013/0016653 A1 | 1/2013 | Kim et al. | |
| 2013/0322413 A1 | 12/2013 | Pelletier et al. | |
| 2014/0169265 A1 | 6/2014 | Park et al. | |
| 2015/0215903 A1* | 7/2015 | Zhao | H04W 72/02 |
| | | | 370/329 |
| 2017/0171899 A1* | 6/2017 | Seo | H04W 28/08 |
| 2018/0070264 A1* | 3/2018 | Saiwai | H04W 72/04 |
| 2020/0107178 A1* | 4/2020 | Chae | H04L 5/0053 |
| 2020/0228236 A1* | 7/2020 | Xi | H04L 1/0045 |

FOREIGN PATENT DOCUMENTS

| | | |
|---|---|---|
| CN | 105357758 A | 2/2016 |
| CN | 105846882 A | 8/2016 |
| WO | 2010111524 A1 | 9/2010 |
| WO | 2016130341 A1 | 8/2016 |

OTHER PUBLICATIONS

R1-154256 LG Electronics, "Multiple scheduling assignment transmission within a SC period", 3GPP TSG RAN WG1 Meeting #82, Beijing, China, Aug. 24-28, 2015, total 6 pages.

R1-1712918 ZTE, "Resource scheme of FeD2D Relay", 3GPP TSG RAN WG1 Meeting #90, Prague, Czech Republic, Aug. 21-25, 2017, total 5 pages.

R1-100274 Huawei, "Difficulty in Detection of PDCCHs for Type 2 Relay", 3GPP TSG RAN WG1 meeting #59bis, Valencia, Spain, Jan. 18-22, 2010, total 2 pages.

* cited by examiner

PHYSICAL DOWNLINK CONTROL CHANNEL PROCESSING METHOD AND RELATED DEVICE

CROSS-REFERENCE TO RELATED APPLICATIONS

This application is a National Stage of International Application No. PCT/CN2018/087181, filed on May 16, 2018, which claims priority to Chinese Patent Application No. 201710911805.5, filed on Sep. 29, 2017. The disclosures of the aforementioned applications are hereby incorporated by reference in their entireties.

TECHNICAL FIELD

This application relates to the field of communications technologies, and in particular, to a physical downlink control channel processing method and a related device.

BACKGROUND

Cellular network based device-to-device (D2D) communication (also referred to as proximity services (ProSe) in 3GPP) is a new technology that allows terminals to directly communicate with each other by reusing cell resources. This technology can improve spectral efficiency of a cellular communications system. The D2D communication includes an operation of relaying from user equipment to a network, namely, a UE-to-network relay operation. In this operation, remote user equipment (remote UE) may connect to a network by using relay user equipment (relay UE). The remote UE may be a low-capability device, for example, a wearable device. The remote UE is characterized by a small volume, a small battery capacity, a relatively low radio frequency capability, and the like. The relay UE may be a high-capability device, for example, a high-capability smartphone, and may be used as a relay node to assist the low-capability device in communicating with the network, so that power consumption of the remote UE is reduced and a standby time is prolonged.

In the D2D communication, a network device may schedule a sending and/or receiving resource for the remote UE by using the relay UE. For example, the relay UE receives downlink control information (DCI) that is sent by the network device and that is used to schedule the remote UE, and then forwards the DCI to the remote UE. The DCI includes information about the sending and/or receiving resource of the remote UE. However, when the relay UE is connected to a plurality of remote UEs, the relay UE needs to perform, based on a radio network temporary identifier of each remote UE, a plurality of detections on a physical downlink control channel (PDCCH) that carries the DCI of the remote UE, to receive the DCI that is sent by the network device and that is used to schedule the remote UE. Consequently, complexity of PDCCH decoding by the relay UE is greatly increased.

SUMMARY

This application provides a physical downlink control channel processing method and a related device, to reduce complexity of PDCCH decoding by relay UE in D2D communication.

According to one aspect, this application provides a physical downlink control channel processing method. In the method, a search space may be determined based on a first radio network temporary identifier, where the search space is a set of M candidate physical downlink control channels, and M is an integer greater than or equal to 1; and a target physical downlink control channel is detected from the search space based on a second radio network temporary identifier, where the first radio network temporary identifier is a radio network temporary identifier of a first device or a second device, the second radio network temporary identifier is the radio network temporary identifier of the second device, first downlink control information carried by the target physical downlink control channel is information that is scrambled by using the second radio network temporary identifier and that is used to schedule the second device, and the second device communicates with a network by using the first device. It can be learned that, in this method, a quantity of candidate physical downlink control channels to be detected can be reduced by using the second radio network temporary identifier, so that detection complexity is reduced.

The information used to schedule the second device may include information about a resource for scheduling the second device to send and/or receive data, or may include information indicating a parameter used by the second device to send and/or receive data.

In an implementation, the first device may perform the physical downlink control channel processing method. To be specific, the first device determines the search space based on the radio network temporary identifier of the first device, and detects the target physical downlink control channel in the search space based on the second radio network temporary identifier. The second radio network temporary identifier is the radio network temporary identifier of the second device, the first downlink control information carried by the target physical downlink control channel is the information that is scrambled by using the second radio network temporary identifier and that is used to schedule the second device, and the second device communicates with the network by using the first device. In this implementation, the first device may determine a same search space for all second devices, so that a quantity of times of determining the search space is reduced, a range of the search space in which the first device detects the physical downlink control channel is narrowed down, and complexity of physical downlink control channel detection by the first device is reduced. Correspondingly, in the same search space, a radio network temporary identifier of each second device needs to be used to separately detect a physical downlink control channel that carries information used to schedule the corresponding second device.

In another implementation, that the first device performs the physical downlink control channel processing method may include: the first device determines the search space based on the radio network temporary identifier of the second device, and detects the target physical downlink control channel based on the radio network temporary identifier of the second device. The first downlink control information carried by the target physical downlink control channel is the information that is scrambled by using the second radio network temporary identifier and that is used to schedule the second device, and the second device communicates with the network by using the first device.

In still another implementation, the second device may perform the physical downlink control channel processing method. To be specific, the second device determines the search space based on the radio network temporary identifier of the first device, and detects the target physical downlink control channel in the search space based on the radio network temporary identifier of the second device. The first downlink control information carried by the target physical downlink control channel is the information that is scrambled by using the second radio network temporary identifier and that is used to schedule the second device, and the second device communicates with the network by using the first device. In this implementation, the second device further needs to receive indication information sent by the network device or the first device, and the indication information is used to indicate the radio network temporary identifier of the first device. It can be learned that in this implementation, the first device and the second device may simultaneously detect the target PDCCH, so that detection complexity of the first device can be reduced.

In yet another implementation, that the second device performs the physical downlink control channel processing method may include: the second device determines the search space based on the radio network temporary identifier of the second device, and detects the target physical downlink control channel in the search space based on the radio network temporary identifier of the second device. The first downlink control information carried by the target physical downlink control channel is the information that is scrambled by using the second radio network temporary identifier and that is used to schedule the second device, and the second device communicates with the network by using the first device. In this implementation, a processing process of the target PDCCH is performed by the second device, so that detection complexity of the first device can be reduced.

When at least two second devices communicate with the network by using the first device, the physical downlink control channel processing method may include: for each second device, the first device determines the search space based on the radio network temporary identifier of the first device, and detects the target physical downlink control channel in the search space based on the radio network temporary identifier of the second device, where the first downlink control information carried by the target physical downlink control channel is the information that is scrambled by using the radio network temporary identifier of the second device and that is used to schedule the second device.

Alternatively, when at least two second devices communicate with the network by using the first device, the physical downlink control channel processing method may include: for each second device, the second device may determine the search space based on the radio network temporary identifier of the first device, and detect the target physical downlink control channel in the search space based on the radio network temporary identifier of the second device, where the first downlink control information carried by the target physical downlink control channel is the information that is scrambled by using the radio network temporary identifier of the second device and that is used to schedule the second device.

Alternatively, when at least two second devices communicate with the network by using the first device, the physical downlink control channel processing method may include: for each second device, the first device determines the search space based on the radio network temporary identifier of the second device, and detects the target physical downlink control channel in the search space based on the radio network temporary identifier of the second device, where the first downlink control information carried by the target physical downlink control channel is the information that is scrambled by using the radio network temporary identifier of the second device and that is used to schedule the second device.

Alternatively, when at least two second devices communicate with the network by using the first device, the physical downlink control channel processing method may include: for each second device, the second device may determine the search space based on the radio network temporary identifier of the second device, and detect the target physical downlink control channel in the search space based on the radio network temporary identifier of the second device, where the first downlink control information carried by the target physical downlink control channel is the information that is scrambled by using the radio network temporary identifier of the second device and that is used to schedule the second device.

The search space may be a set of candidate physical downlink control channels (PDCCH candidates). One candidate PDCCH is transmitted on one or more aggregated control channel elements (CCE), and a quantity of aggregated CCEs is an aggregation level of the candidate PDCCH. Detecting the target PDCCH in the search space may be understood as detecting the target PDCCH on CCEs occupied by the plurality of candidate PDCCHs included in the search space, and the target PDCCH may be detected on a CCE occupied by one of the candidate PDCCHs. Detecting the target PDCCH may be understood as decoding the PDCCH based on the downlink control information used to schedule the second device, or may be understood as detecting the downlink control information that is carried by the PDCCH and that is used to schedule the second device.

Optionally, in the physical downlink control channel processing methods described in the foregoing implementations, at least one candidate physical downlink control channel may be further determined from the search space based on a first identifier of the second device, and the target physical downlink control channel is detected on the at least one candidate physical downlink control channel by using the second radio network temporary identifier. It can be learned that, in this implementation, a quantity of candidate physical downlink control channels to be detected during detection of the target PDCCH can be further reduced, and radio network temporary identifiers of a smaller quantity of second devices are used on one candidate physical downlink control channel to separately detect a physical downlink control channel that carries information used to schedule a corresponding second device, so that detection complexity is reduced.

Correspondingly, when the at least two second devices communicate with the network by using the first device, in this implementation, on each candidate physical downlink control channel, the target PDCCH may be detected by using radio network temporary identifiers of only some of the second devices, and does not need to be detected by using radio network temporary identifiers of all the second devices one by one, so that detection complexity is reduced.

Determining the at least one candidate physical downlink control channel from the search space based on the first identifier of the second device may be: determining, from the search space based on the first identifier of the second device, at least one candidate physical downlink control channel whose index satisfies the following formula:

$m \bmod n1 = (\text{identity} \bmod n1)$, where n1 is an integer and n1≤M; m is an index of each candidate physical downlink control channel in the search space, where m=0, 1, . . . , M−1; the identity is the first identifier of the second device; and n1 is predefined, and is configured by the network device or determined by the first device.

For example, a value of n1 may be determined by the first device or the network device based on a quantity of second devices that communicate with the network device by using the first device. The larger the quantity of second devices, the larger n1 may be. When the quantity of second devices is fixed, a larger n1 indicates that radio network temporary identifiers (RNTI) of a smaller quantity of second devices may be used for detection on each candidate PDCCH. To be specific, the target PDCCH is detected by using the RNTI of the second device in a smaller quantity of time units.

Optionally, the value of n1 may vary depending on an aggregation level of the search space. For example, n1 may be M multiplied by a scale factor k, $0<k\leq1$. For different aggregation levels, the scale factor remains the same, and may be specified in a standard protocol, or configured by the network device, or determined by the first device.

For example, assuming that n1=2 and m=0, 1, 2, 3, during detection of the target PDCCH, an index of the at least one candidate PDCCH mod 2 is equal to the first identifier of the second device mod 2. Assuming that the first identifier of the second device mod 2 is equal to 0, candidate PDCCHs that satisfy the foregoing formula are a PDCCH 0 and a PDCCH 2. It can be learned that in this implementation, the target PDCCH may be detected on the PDCCH 0 and the PDCCH 2 by using the RNTI of the second device. To be specific, the PDCCH that carries the information used to schedule the second device is detected.

In other words, in this implementation, according to the physical downlink control channel processing method, the target PDCCH needs to be detected on only some candidate PDCCHs in the search space, and does not need to be detected on all the candidate PDCCHs. To be specific, in this implementation, on a candidate PDCCH m, the target PDCCH needs to be detected by using an RNTI of only a second device identified by an identity that satisfies identity mod n1=m mod n1, and does not need to be detected by using RNTIs of all the second devices. In this way, target PDCCH detection complexity is reduced.

Optionally, before determining the search space based on the first radio network temporary identifier, the first device or the second device may further determine at least one time unit based on the first identifier of the second device, where the at least one time unit includes the PDCCH that carries the information used to schedule the second device. Correspondingly, the first device or the second device may determine the search space in the at least one time unit based on the first radio network temporary identifier, and further detect the target PDCCH in the search space based on the second radio network temporary identifier.

It can be learned that, in this implementation, the target PDCCH is not detected in all time units, so that target PDCCH detection complexity is reduced.

Optionally, determining the at least one time unit based on the first identifier of the second device may be: determining, from a plurality of time units, at least one time unit whose index satisfies the following formula:

$$i \bmod n2 = (\text{identity} \bmod n2), \text{ where}$$

n2 is an integer and $n2 \leq N$; i is an index of each of the plurality of time units, where i=0, 1, . . . , N−1, and N is a quantity of the plurality of time units; the identity is the first identifier of the second device; and n2 is predefined, and is configured by the network device or determined by the first device.

The time unit may be any one of a subframe, a slot, a mini-slot, and an orthogonal frequency division multiplexing (OFDM) symbol, or may be another time unit or the like. This is not limited in this embodiment of the present invention.

Correspondingly, N may be a quantity of time units in a period of time, for example, a quantity of non-uplink subframes in one radio frame, or a quantity of downlink subframes in one radio frame, or a quantity of non-uplink subframes in 1024 radio frames, or a quantity of downlink subframes in 1024 radio frames, or a quantity of slots, symbols, mini-slots, or other finer-grained time units in one subframe. This is not limited in this embodiment of the present invention.

For example, a value of n2 may be determined by the first device or the network device based on a quantity of second devices that communicate with the network device by using the first device. The larger the quantity of second devices, the larger n2 may be. When the quantity of second devices is fixed, a larger n2 indicates that the target PDCCH may be detected in each time unit by using RNTIs of a smaller quantity of second devices. To be specific, the target PDCCH is detected by using the RNTI of the second device in a smaller quantity of time units.

Optionally, the value of n2 may vary depending on an aggregation level of the search space. For example, n2 may be M multiplied by a scale factor k, $0<k\leq1$. For different aggregation levels, the scale factor remains the same, and may be specified in a standard protocol, or configured by the network device, or determined by the first device.

For example, assuming that n2=2 and i=0, 1, 2, 3, during detection of the target PDCCH, an index of at least one non-downlink subframe in which the target PDCCH can be transmitted is obtained based on the first identifier of the second device mod 2. Assuming that the first identifier of the second device mod 2 is equal to 0, non-downlink subframes that satisfy the foregoing formula are a subframe 0 and a subframe 2. It can be learned that in this implementation, the target PDCCH may be detected in only the subframe 0 and the subframe 2, and does not need to be detected in all non-downlink subframes, so that detection complexity is further reduced.

It can be learned that on one candidate PDCCH in the search space in each time unit, radio network temporary identifiers (RNTI) of only some second devices need to be used for PDCCH detection or descrambling. To be specific, a PDCCH that carries DCI used to schedule a second device identified by an identity may be detected only in time units that satisfy i mod n2=(identity mod n2), and does not need to be detected in all time units. In this way, target PDCCH detection complexity is reduced.

The first identifier of the second device may be the second radio network temporary identifier (for example, a cell radio network temporary identifier (C-RNTI) or a sidelink radio network temporary identifier (SL-RNTI)), an index of a second identifier of the second device in a target list reported by the first device, a local identifier (Local ID) of the second device, a proximity-services terminal identifier (Proximity-services UE ID, ProSe UE ID) of the second device, or a layer 2 identifier (Layer-2 ID) of the second device. The second identifier of the second device is the local identifier of the second device, the proximity-services terminal identifier of the second device, or the layer 2 identifier of the second device.

For example, the first identifier of the second device is the index of the second identifier of the second device in the target list reported by the first device. Specifically, the first device indicates, in the target list, one or more target devices with which the first device communicates, and each target device is identified by using a second identifier. For example, the first device indicates, in the target list destinationInfoList, one or more targets destination with which the first device performs sidelink communication, and each target destination is identified by using a ProSe UE ID. To be specific, the target list destinationInfoList includes one or more ProSe UE IDs, and each second device has its own ProSe UE ID. In this case, the first identifier of the second device may be the index of the second identifier of the second device in the target list reported by the first device, namely, an index of the ProSe UE ID of the second device in the target list.

Optionally, an embodiment of the present invention further provides a physical downlink control channel processing method. In the physical downlink control channel processing method, the at least one time unit may be determined by using the first identifier of the second device; the search space is determined in the at least one time unit based on the first radio network temporary identifier; further, the at least one candidate PDCCH is determined from the search space based on the first identifier of the second device; and further, the PDCCH that carries the DCI used to schedule the second device is detected on the at least one candidate PDCCH based on the radio network temporary identifier of the second device. For details, refer to the content described in the foregoing two implementations, and details are not described herein again.

When the first radio network temporary identifier is the radio network temporary identifier of the first device, the first radio network temporary identifier may be a radio network temporary identifier used to scramble second downlink control information, and the second downlink control information is information used to schedule uplink transmission or downlink reception of the first device, or is information used to schedule sidelink transmission or sidelink reception of the first device.

When the first radio network temporary identifier is the radio network temporary identifier of the first device, a payload size of the downlink control information carried by the target physical downlink control channel is equal to a payload size of downlink control information that is in the search space and that is used to schedule the first device. In this way, when detecting the target PDCCH by using the radio network temporary identifier of the second device, the first device may determine that the payload size of the DCI carried by the target PDCCH is equal to the payload size of the DCI used to schedule the first device, that is, may determine to perform, by using the payload size of the DCI used to schedule the first device, a reverse process of rate matching during detection of the target PDCCH, instead of performing a reverse process of rate matching by using payload sizes of pieces of available DCI one by one and then performing descrambling by using the second radio network temporary identifier. In this way, a quantity of detections is reduced, and PDCCH detection complexity is further reduced.

According to another aspect, this application further provides a physical downlink control channel processing method. In the physical downlink control channel processing method, a network device may determine a search space based on a first radio network temporary identifier, where the search space is a set of M candidate physical downlink control channels, and M is an integer greater than or equal to 1; and the network device sends a target physical downlink control channel in the search space based on a second radio network temporary identifier, where first radio network temporary identifier is a radio network temporary identifier of a first device or a second device, first downlink control information carried by the target physical downlink control channel is information that is scrambled by using the second radio network temporary identifier and that is used to schedule the second device, the second radio network temporary identifier is the radio network temporary identifier of the second device, and the second device communicates with a network by using the first device.

That the network device sends a target physical downlink control channel in the search space based on a second radio network temporary identifier may be understood as scrambling the target PDCCH in the search space by using the second radio network temporary identifier, or scrambling, in the search space by using the second radio network temporary identifier, the DCI that is carried by the PDCCH and that is used to schedule the second device. Correspondingly, scrambling the DCI may refer to scrambling a CRC parity bit by using a radio network temporary identifier after cyclic redundancy check (CRC) attachment is performed for the DCI, or may refer to scrambling, by using an RNTI, a sequence obtained after CRC attachment is performed for the DCI.

To be specific, a physical downlink control channel processing method may include: determining, by the network device, the search space based on the radio network temporary identifier of the first device, where the search space is a set of M candidate physical downlink control channels, and M is an integer greater than or equal to 1; and sending, by the network device, the target physical downlink control channel in the search space based on the second radio network temporary identifier, where the first downlink control information carried by the target physical downlink control channel is the information that is scrambled by using the radio network temporary identifier of the second device and that is used to schedule the second device, and the second device communicates with the network by using the first device. In this implementation, for all second devices, the network device determines the search space by using the radio network temporary identifier of the first device, and the first device does not need to separately determine the search space based on a radio network temporary identifier of each second device, so that complexity of PDCCH detection by the first device is reduced.

Another physical downlink control channel processing method may include: determining, by the network device, the search space based on the radio network temporary identifier of the second device, where the search space is a set of M candidate physical downlink control channels, and M is an integer greater than or equal to 1; and sending, by the network device, the target physical downlink control channel in the search space based on the second radio network temporary identifier, where the first downlink control information carried by the target physical downlink control channel is the information that is scrambled by using the radio network temporary identifier of the second device and that is used to schedule the second device, and the second device communicates with the network by using the first device. In this implementation, each second device corresponds to one search space, so that each second device determines the search space based on a radio network temporary identifier of the second device and detects a PDCCH that carries information used to schedule the second device. In this way, detection complexity of the first device is reduced.

The search space may be a set of candidate physical downlink control channels. One candidate PDCCH is transmitted on one or more aggregated control channel elements (CCE), and a quantity of aggregated CCEs is an aggregation level of the candidate PDCCH. To be specific, that the network device sends a target PDCCH in the search space may be understood as that the network device may transmit the target PDCCH on CCEs occupied by the plurality of candidate PDCCHs included in the search space. The target PDCCH is transmitted on a CCE occupied by a specific candidate PDCCH, and the candidate PDCCH is determined by the network device based on a related parameter. This is not limited in this embodiment of the present invention. Transmitting the target PDCCH may be understood as transmitting, on the PDCCH, the downlink control information used to schedule the second device.

It can be learned that the network device may send, in the search space determined based on the first radio network temporary identifier, the PDCCH that carries the information used to schedule the second device, so that the first device can use the first radio network temporary identifier to reduce a quantity of candidate physical downlink control channels to be detected by using the second radio network temporary identifier. In this way, complexity of PDCCH detection by the first device is reduced.

Optionally, the network device may determine at least one candidate physical downlink control channel from the search space based on a first identifier of the second device. Correspondingly, that the network device sends a target physical downlink control channel in the search space based on a second radio network temporary identifier may include: sending, by the network device, the target physical downlink control channel on the at least one candidate physical downlink control channel based on the second radio network temporary identifier. To be specific, the network device sends, based on the second radio network temporary identifier, the target physical downlink control channel on a CCE occupied by the at least one candidate physical downlink control channel. The target PDCCH is transmitted on a CCE occupied by a specific candidate PDCCH, and the candidate PDCCH is determined by the network device based on a related parameter. This is not limited in this embodiment of the present invention. In this way, the network device further reduces a quantity of candidate PDCCHs, and further reduces PDCCH detection complexity.

Optionally, that the network device determines at least one candidate physical downlink control channel from the search space based on a first identifier of the second device may be: the network device determines, from the search space, at least one candidate physical downlink control channel whose index satisfies the following formula:

$m \bmod n1 = (\text{identity} \bmod n1)$, where n1 is an integer and n1≤M; m is an index of each candidate physical downlink control channel in the search space, where m=0, 1, ..., M−1; the identity is the first identifier of the second device; and n1 is predefined, and is configured by the network device or determined by the first device.

It can be learned that in this implementation, in the physical downlink control channel processing method, the target PDCCH is sent on some candidate PDCCHs in the search space. In other words, in this implementation, the target PDCCH may be sent on some candidate PDCCHs in the search space by using the second radio network temporary identifier. In other words, in this implementation, DCI scrambled by using the RNTI of the second device needs to be sent to the first device on only a candidate PDCCH that satisfies m mod n1=identity mod n1. In this way, detection complexity of the first device or the second device is reduced.

Optionally, the network device may determine at least one time unit based on the first identifier of the second device. Correspondingly, that a network device determines a search space based on a first radio network temporary identifier includes: determining, by the network device, the search space in the at least one time unit based on the first radio network temporary identifier. It can be learned that in this implementation, the network device sends the target PDCCH only in time units determined based on first identifiers of some second devices, so that detection complexity of the first device and the second device is reduced.

Optionally, that the network device determines at least one time unit based on the first identifier of the second device includes: the network device determines, from a plurality of time units, at least one time unit whose index satisfies the following formula:

$i \bmod n2 = (\text{identity} \bmod n2)$, where n2 is an integer and n2≤N; i is an index of each of the plurality of time units, where i=0, 1, ..., N−1, and N is a quantity of the plurality of time units; the identity is the first identifier of the second device; and n2 is predefined, and is configured by the network device or determined by the first device.

It can be learned that in this implementation, a time unit in which the network device sends the target PDCCH is determined based on the first identifier of the second device, and the target PDCCH may not be sent in all subframes. To be specific, the network device sends, only in time units that satisfy i mod n2=(identity mod n2), a PDCCH that carries DCI used to schedule a second device identified by the identity. To be specific, a PDCCH that is sent by the network device in each time unit and that carries DCI used to schedule a second device is a PDCCH scrambled by using RNTIs of second devices that have a same value of identity mod n2. In this way, target PDCCH detection complexity is reduced.

The first identifier of the second device is the second radio network temporary identifier, an index of a second identifier of the second device in a target list reported by the first device, a local identifier of the second device, a proximity-services terminal identifier of the second device, or a layer 2 identifier of the second device. The second identifier of the second device is the local identifier of the second device, the proximity-services terminal identifier of the second device, or the layer 2 identifier of the second device.

When the first radio network temporary identifier is the radio network temporary identifier of the first device, the first radio network temporary identifier may be a radio network temporary identifier used to scramble second downlink control information, and the second downlink control information is information used to schedule uplink transmission or downlink reception of the first device, or is information used to schedule sidelink transmission or sidelink reception of the first device.

When the first radio network temporary identifier is the radio network temporary identifier of the first device, a payload size of the downlink control information carried by the target physical downlink control channel is equal to a payload size of downlink control information that is in the search space and that is used to schedule the first device. In other words, the payload size of the downlink control information that is carried by the target PDCCH sent by the network device is equal to the payload size of the downlink control information that is in the search space and that is used to schedule the first device. In this way, when detecting the target PDCCH by using the radio network temporary identifier of the second device, the first device may determine that the payload size of the DCI carried by the target PDCCH is equal to the payload size of the DCI used to schedule the first device, that is, may determine to perform, by using the payload size of the DCI used to schedule the first device, a reverse process of rate matching during detection of the target PDCCH, instead of performing a reverse process of rate matching by using payload sizes of pieces of available DCI one by one and then performing descrambling by using the second radio network temporary identifier. In this way, a quantity of detections is reduced, and PDCCH detection complexity is further reduced.

For related explanations of this aspect, refer to the related examples and explanations in the foregoing aspect or embodiment. Details are not described herein again.

According to still another aspect, an embodiment of the present invention further provides a device, and the device has a function of implementing the method according to the first aspect in the foregoing method embodiment. The function may be implemented by hardware, or implemented by hardware executing corresponding software. The hardware or software includes one or more units or modules corresponding to the foregoing function.

In a possible design, a structure of the device may include a determining unit and a detection unit. The determining unit and the detection unit are configured to support communication between the device and another device. The device may further include a storage unit. The storage unit is configured to be coupled to the determining unit and the detection unit, and the storage unit stores a program instruction and data that are necessary for the device. As an example, the determining unit and the detection unit may be a transceiver, and the storage unit may be a memory.

According to still another aspect, an embodiment of the present invention provides a network device, and the network device has a function of implementing network device behavior in the foregoing method embodiment. The function may be implemented by hardware, or implemented by hardware executing corresponding software. The hardware or software includes one or more units or modules corresponding to the foregoing function.

In a possible design, a structure of the network device includes a determining unit and a sending unit. The determining unit and the sending unit are configured to support the network device in performing the corresponding functions in the foregoing method. The determining unit and the sending unit are configured to support communication between the network device and another device. The network device may further include a storage unit. The storage unit is configured to be coupled to the determining unit and the sending unit, and the storage unit stores a program instruction and data that are necessary for the network device. As an example, the determining unit may be a processor, the sending unit may be a transceiver, and the storage unit may be a memory.

According to still another aspect, this application provides a communications system, and the system includes the first device, the second device, and/or the network device in the foregoing aspects. In another possible design, the system may further include another device that interacts with the first device, the second device, or the network device in the solutions provided in the embodiments of the present invention.

According to still another aspect, this application provides a computer storage medium, configured to store computer software instructions used by the foregoing first device or second device. The computer software instructions include a program designed to execute the foregoing aspects.

According to still another aspect, this application provides a computer storage medium, configured to store computer software instructions used by the foregoing network device. The computer software instructions include a program designed to execute the foregoing aspects.

According to still another aspect, this application further provides a computer program product that includes an instruction. When the computer program product runs on a computer, the computer is enabled to perform the methods according to the foregoing aspects.

According to still another aspect, this application provides a chip system. The chip system includes a processor, configured to support the first device and the second device in implementing the functions in the foregoing aspects, for example, determining or detecting the data and/or the information in the foregoing methods. In a possible design, the chip system further includes a memory. The memory is configured to store a program instruction and data that are necessary for the first device or the second device. The chip system may include a chip, or may include a chip and another discrete device.

According to still another aspect, this application provides a chip system. The chip system includes a processor, configured to support the network device in implementing the functions in the foregoing aspects, for example, receiving or processing the data and/or the information in the foregoing methods. In a possible design, the chip system further includes a memory. The memory is configured to store a program instruction and data that are necessary for the network device. The chip system may include a chip, or may include a chip and another discrete device.

DESCRIPTION OF EMBODIMENTS

Figure 1:
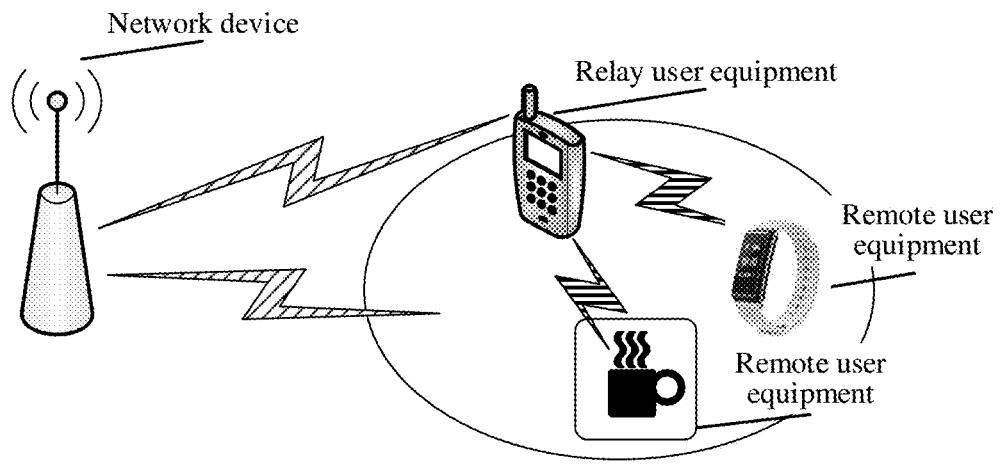
FIG. 1 is a schematic structural diagram of cellular network based device-to-device communication according to an embodiment of the present invention.

Terms used in implementations of this application are merely used to explain specific embodiments of this application, but are not intended to limit this application.

In embodiments of this application, a first device may be a relay node, a base station, a terminal, a mobile station (MS), a mobile terminal, or the like. The first device may communicate with one or more core networks through, for example, a radio access network (RAN). For example, the first device may be a mobile phone (also referred to as a "cellular" phone) and a computer with a mobile terminal, or may be a portable, pocket-sized, handheld, computer built-in, or vehicle-mounted mobile apparatus. These devices exchange voice and/or data with the radio access network.

In embodiments of this application, a second device may be a terminal, a mobile station (MS), a mobile terminal, or the like. For example, the second device may be a wearable device, which is characterized by a small volume, a small battery capacity, a relatively low radio frequency capability, or the like.

In embodiments of this application, the network device may be a base station in GSM or CDMA, for example, a base transceiver station (BTS); or may be a base station in WCDMA, for example, a NodeB; or may be an evolved NodeB in LTE, for example, an eNB or an e-NodeB (evolutional Node B), or a base station in a 5G system or a new radio (NR) system, for example, a next generation node B (gNB), or a base station in a future network. This is not limited in the embodiments of the present invention. Alternatively, the base station may be an access point (AP), a transmission point (Trans TRP), a central unit (CU), or another network entity, and may include some or all functions of the foregoing network entity.

In embodiments of this application, a time unit is a unit of time used for data transmission. For example, the time unit may be a subframe, or may be a slot, or may be a radio frame, a mini/micro-slot, a plurality of aggregated slots, a plurality of aggregated subframes, or the like, or may be a transmission time interval (TTI). This is not limited in embodiments of this application. One transmission time interval is equal to a sum of lengths of several subframes, or a sum of several transmission time intervals is equal to a length of one subframe. A subframe is used as an example. A subframe length used by a carrier may be 15 kHz*2^n (2^n is 2 raised to the power of n), and a corresponding subframe length is 1/(2^n) ms. To be specific, a plurality of transmission time units such as 0.5 ms, 0.25 ms, and 0.125 ms are supported. n is an integer.

In embodiments of this application, a physical downlink control channel may also be substituted by an enhanced physical downlink control channel or another control channel. This is not limited in the embodiments of the present invention. Correspondingly, downlink control information may also be substituted by other control information. This is not limited in the embodiments of the present invention. A radio network temporary identifier of the first device or the second device may also be another identifier. This is not limited in the embodiments of the present invention.

That the second device communicates with a network by using the first device may be that, data transmitted between the second device and the network is forwarded by the first device, or the first device and the second device are connected, or the first device and the second device are associated, or the like. This is not limited in the embodiments of the present invention.

FIG. 1 is a schematic structural diagram of cellular network based device-to-device communication according to an embodiment of the present invention. As shown in FIG. 1, a remote device (Remote User Equipment, Remote UE) and a relay device (Relay User Equipment, Relay UE) may directly communicate with each other by reusing cell resources. The device-to-device (D2D) communications technology can improve spectral efficiency of a cellular communications system, reduce terminal transmit power, and mitigate a lack of spectrum resources of a wireless communications system to some extent.

For example, in the future, people wear various wearable devices. These devices need to communicate with a network to transmit data or establish a voice call service. Because a distance between the wearable device and a smartphone is far shorter than a distance between the wearable device and a base station, if the wearable device can connect to the network through relay of the smartphone, power consumption of the wearable device can be reduced, and a transmission rate of the wearable device can be increased.

However, a resource used for communication between the remote UE and the relay UE needs to be delivered by a network device, for example, a base station. For example, the network device may send downlink control information (DCI) to a terminal, and the DCI includes scheduling information used to schedule the terminal, for example, a resource used by the terminal to send data or receive data. The DCI is transmitted on a physical downlink control channel (PDCCH), and the DCI is scrambled by using a radio network temporary identifier (RNTI) of the terminal. In other words, the PDCCH that carries the DCI is scrambled by using the RNTI of the terminal. The terminal may detect, based on the RNTI, the PDCCH sent by the network device to the terminal. The network device may also send the PDCCH of the terminal based on the RNTI.

In D2D communication, the network device sends DCI used to schedule the remote UE, where the DCI includes information about a sending resource and/or a receiving resource of the remote UE. After receiving the DCI, the relay UE forwards the DCI to the remote UE. Therefore, the DCI sent by the network device may be scrambled by using an RNTI of the remote UE. However, if there are a plurality of remote UEs communicating with the network at the same time by using the relay UE, the relay UE needs to receive pieces of DCI used to schedule the different remote UEs. In this case, the relay UE needs to use an RNTI of each remote UE to detect, on a system bandwidth, a PDCCH that carries corresponding DCI. Each detection process of the relay UE includes reverse processes of layer mapping, precoding, modulation, scrambling, rate matching, and the like on a modulation symbol sequence transmitted on a time-frequency resource occupied by each candidate PDCCH, channel decoding, CRC de-check (that is, CRC de-check using an RNTI), and the like. Therefore, the relay UE needs to use an RNTI of each remote UE to detect, on a system bandwidth, a PDCCH that carries corresponding DCI, and detection complexity of the relay UE is greatly increased.

To resolve this problem, embodiments of this application provide a physical downlink control channel processing method and a related device, to reduce detection complexity of a relay UE.

According to the physical downlink control channel processing method, the detection complexity of the relay UE is reduced by narrowing down a range of candidate PDCCHs to be detected, that is, by narrowing down a search space.

Figure 2:
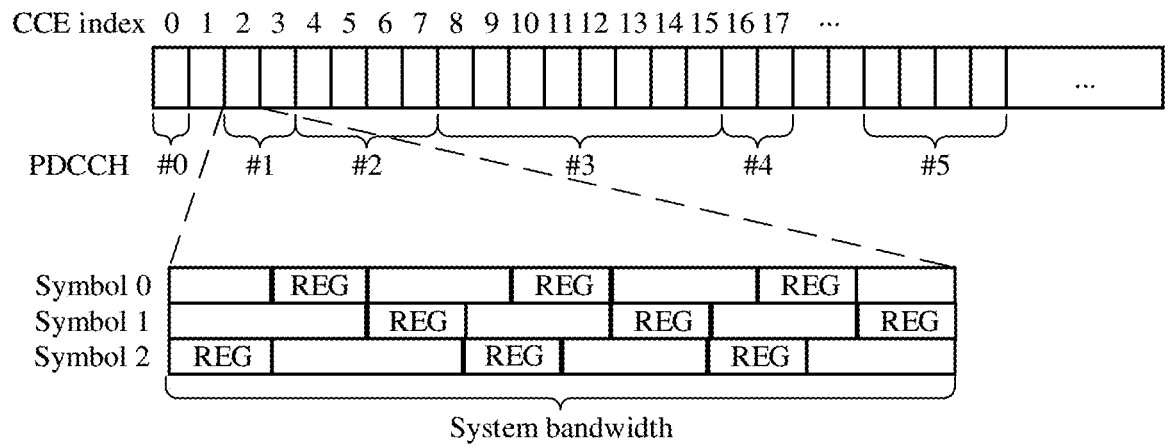
FIG. 2 is a schematic diagram of a search space according to an embodiment of the present invention.

A device that may serve as remote UE is generally referred to as the second device, and a device that may serve as relay UE is generally referred to as the first device. In other words, the second device may communicate with a network by using the first device. The search space may be a set of candidate physical downlink control channels. One candidate PDCCH is transmitted on one or more aggregated control channel elements (CCE), and a quantity of aggregated CCEs is an aggregation level of the candidate PDCCH. For example, FIG. 2 is a schematic diagram of a PDCCH according to an embodiment of the present invention. As shown in FIG. 2, a resource granularity of the PDCCH is a CCE, one CCE includes nine resource element groups (REG), and each REG represents four resource elements (RE) other than a reference signal. As shown in FIG. 2, a quantity of CCEs included in each PDCCH varies depending on an aggregation level of the PDCCH. Therefore, a search space $S_k^{(L)}$ varies with an aggregation level L. An operation of determining the search space based on a radio network temporary identifier is described in detail in the following content.

The search space may alternatively be a set of enhanced physical downlink control channels, one enhanced physical downlink control channel is transmitted on one or more aggregated enhanced control channel elements (ECCE), and each ECCE includes four or eight enhanced resource element groups (EREG). REs included in each EREG are defined different from REs included in each REG.

Figure 3:
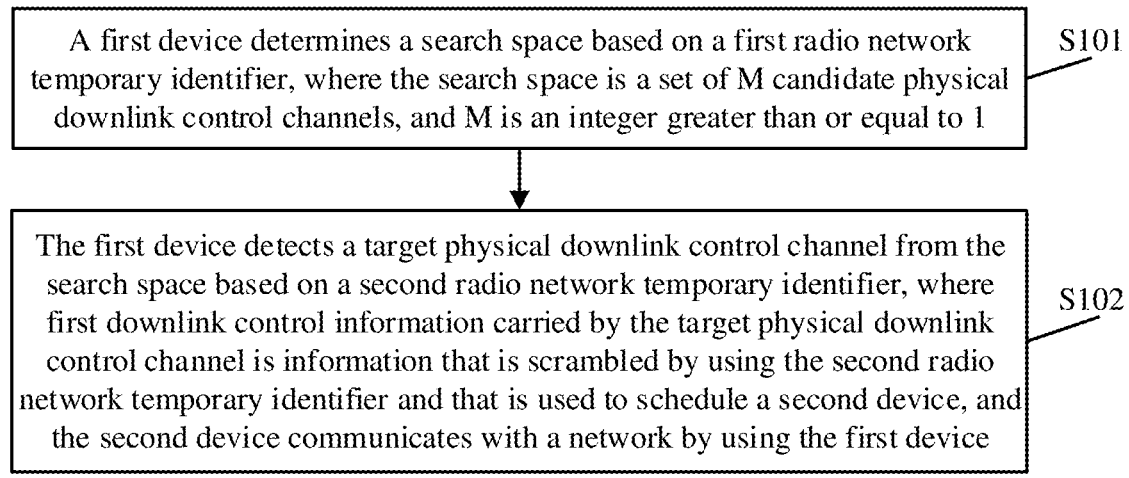
FIG. 3 is a schematic flowchart of a physical downlink control channel processing method according to an embodiment of the present invention.

FIG. 3 is a schematic flowchart of a physical downlink control channel processing method according to an embodiment of the present invention. As shown in FIG. 3, the physical downlink control channel processing method shown in FIG. 3 is performed by a first device, and the physical downlink control channel processing method may include the following steps:

S101. The first device determines a search space based on a first radio network temporary identifier, where the search space is a set of M candidate physical downlink control channels, and M is an integer greater than or equal to 1.

S102. The first device detects a target physical downlink control channel from the search space based on a second radio network temporary identifier.

The first radio network temporary identifier is a radio network temporary identifier of the first device or a second device, the second radio network temporary identifier is the radio network temporary identifier of the second device, first downlink control information carried by the target physical downlink control channel is information that is scrambled by using the second radio network temporary identifier and that is used to schedule the second device, and the second device communicates with a network by using the first device.

The information used to schedule the second device may include information about a resource for scheduling the second device to send and/or receive data, or may include information indicating a parameter used by the second device to send and/or receive data.

Alternatively, that the first device detects a target physical downlink control channel from the search space based on a second radio network temporary identifier may be that the first device monitors, decodes, or receives the target physical downlink control channel or information carried by the target physical downlink control channel from the search space based on the second radio network temporary identifier. Detecting the target PDCCH from the search space based on the second radio network temporary identifier may be: descrambling a PDCCH in the search space by using the second radio network temporary identifier, or descrambling, by using the second radio network temporary identifier, DCI carried by a PDCCH in the search space. In this way, if a PDCCH or DCI scrambled by using the second radio network temporary identifier is detected, the PDCCH is the target PDCCH, and the DCI is the information carried by the target PDCCH and used to schedule the second device.

In an implementation, when scrambling the DCI refers to "scrambling, by using an RNTI, a sequence obtained after CRC attachment is performed for the DCI", if it is detected that the sequence obtained after the CRC attachment is performed for the DCI carried by the PDCCH is scrambled by using the second RNTI, the PDCCH is the target PDCCH.

Correspondingly, a method for detecting the target PDCCH may be: descrambling, by using an RNTI, a sequence obtained after channel decoding, where if a CRC de-check result is correct, the target PDCCH is detected; or if a CRC de-check result is incorrect, the target PDCCH is not detected.

In another implementation, when scrambling the DCI refers to "scrambling a CRC parity bit by using an RNTI after CRC attachment is performed for the DCI", if it is detected that the parity bit obtained after the CRC attachment is performed for the DCI carried by the PDCCH is scrambled by using the second RNTI, the PDCCH is the target PDCCH.

Correspondingly, a method for detecting the target PDCCH may be: descrambling, by using an RNTI, a CRC parity bit in a sequence obtained after channel decoding, where if a CRC de-check result is correct, the target PDCCH is detected; or if a CRC de-check result is incorrect, the target PDCCH is not detected.

In the physical downlink control channel processing method shown in FIG. 3, the first device may determine the search space based on the RNTI of the first device or the second device, and then detect the target PDCCH in the search space based on the RNTI of the second device, where the target PDCCH carries the information used to schedule the second device, that is, the downlink control information DCI used to schedule the second device. It can be learned that, compared with the current practice that the target PDCCH is detected on an entire system bandwidth by using only the RNTI of the second device, in this embodiment of the present invention, the search space is determined and then the target PDCCH is determined, so that detection complexity of the first device can be greatly reduced.

Figure 4:
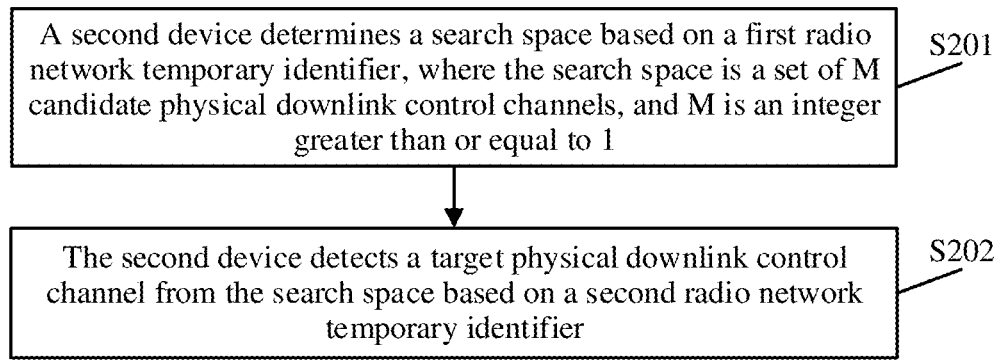
FIG. 4 is a schematic flowchart of another physical downlink control channel processing method according to an embodiment of the present invention.

FIG. 4 is a schematic flowchart of another physical downlink control channel processing method according to an embodiment of the present invention. As shown in FIG. 4, the physical downlink control channel processing method is performed by a second device, and the physical downlink control channel processing method may include the following steps:

S201. The second device determines a search space based on a first radio network temporary identifier, where the search space is a set of M candidate physical downlink control channels, and M is an integer greater than or equal to 1.

S202. The second device detects a target physical downlink control channel from the search space based on a second radio network temporary identifier.

The first radio network temporary identifier is a radio network temporary identifier of a first device or the second device, the second radio network temporary identifier is the radio network temporary identifier of the second device, first downlink control information carried by the target physical downlink control channel is information that is scrambled by using the second radio network temporary identifier and that is used to schedule the second device, and the second device communicates with a network by using the first device.

Alternatively, that the second device detects a target physical downlink control channel from the search space based on a second radio network temporary identifier may be that the second device monitors, decodes, or receives the target physical downlink control channel or information carried by the target physical downlink control channel from the search space based on the second radio network temporary identifier.

Detecting the target PDCCH from the search space based on the second radio network temporary identifier may be: descrambling a PDCCH in the search space by using the second radio network temporary identifier, or descrambling, by using the second radio network temporary identifier, DCI carried by a PDCCH in the search space. In this way, if a PDCCH or DCI scrambled by using the second radio network temporary identifier is detected, the PDCCH is the target PDCCH, and the DCI is the information carried by the target PDCCH and used to schedule the second device.

In an implementation, when scrambling the DCI refers to "scrambling, by using an RNTI, a sequence obtained after CRC attachment is performed for the DCI", if it is detected that the sequence obtained after the CRC attachment is performed for the DCI carried by the PDCCH is scrambled by using the second RNTI, the PDCCH is the target PDCCH.

Correspondingly, a method for detecting the target PDCCH may be: descrambling, by using an RNTI, a sequence obtained after channel decoding, where if a CRC de-check result is correct, the target PDCCH is detected; or if a CRC de-check result is incorrect, the target PDCCH is not detected.

In another implementation, when scrambling the DCI refers to "scrambling a CRC parity bit by using an RNTI after CRC attachment is performed for the DCI", if it is detected that the parity bit obtained after the CRC attachment is performed for the DCI carried by the PDCCH is scrambled by using the second RNTI, the PDCCH is the target PDCCH.

Correspondingly, a method for detecting the target PDCCH may be: descrambling, by using an RNTI, a CRC parity bit in a sequence obtained after channel decoding, where if a CRC de-check result is correct, the target PDCCH is detected; or if a CRC de-check result is incorrect, the target PDCCH is not detected.

A difference between the physical downlink control channel processing method shown in FIG. 4 and the physical downlink control channel processing method shown in FIG. 3 lies in that, in FIG. 4, when the first radio network temporary identifier is the RNTI of the first device, the second device further needs to receive indication information sent by the first device, where the indication information is used to indicate the RNTI of the first device.

It can be learned that, similar to FIG. 3, the second device may also determine the search space based on the first radio network temporary identifier, and then detect the target PDCCH based on the RNTI of the second device, so that a physical downlink control channel PDCCH detection range is narrowed down, and physical downlink control channel detection complexity is reduced.

Figure 5:
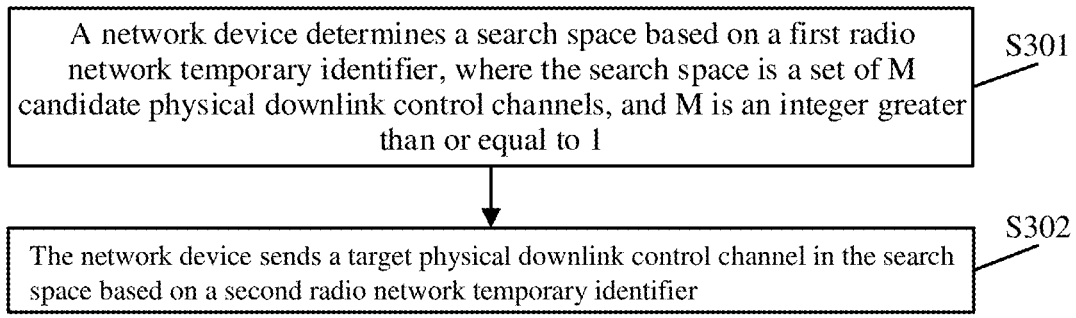
FIG. 5 is a schematic flowchart of still another physical downlink control channel processing method according to an embodiment of the present invention.

FIG. 5 is a schematic flowchart of still another physical downlink control channel processing method according to an embodiment of the present invention. As shown in FIG. 5, the physical downlink control channel processing method is performed by a network device. Correspondingly, the physical downlink control channel processing method performed by the network device may include the following steps:

S301. The network device determines a search space based on a first radio network temporary identifier, where the search space is a set of M candidate physical downlink control channels, and M is an integer greater than or equal to 1.

S302. The network device sends a target physical downlink control channel in the search space based on a second radio network temporary identifier.

The first radio network temporary identifier is a radio network temporary identifier of a first device or a second device, first downlink control information carried by the target physical downlink control channel is information that is scrambled by using the second radio network temporary identifier and that is used to schedule the second device, the second radio network temporary identifier is the radio network temporary identifier of the second device, and the second device communicates with a network by using the first device.

The search space may be a set of candidate physical downlink control channels. One candidate PDCCH is transmitted on one or more aggregated control channel elements (CCE), and a quantity of aggregated CCEs is an aggregation level of the candidate PDCCH. To be specific, that the network device sends a target PDCCH in the search space may be understood as that the network device may transmit the target PDCCH on CCEs occupied by the plurality of candidate PDCCHs included in the search space. The target PDCCH is transmitted on a CCE occupied by a specific candidate PDCCH, and the candidate PDCCH is determined by the network device based on a related parameter. This is not limited in this embodiment of the present invention. Transmitting the target PDCCH may be understood as transmitting, on the PDCCH, the downlink control information used to schedule the second device.

In the embodiments in FIG. 3 to FIG. 5, determining the search space based on the first radio network temporary identifier is: determining, based on the first radio network temporary identifier, a CCE occupied by each candidate PDCCH in the search space. For example, a CCE corresponding to a candidate PDCCH m in a search space $S_k^{(L)}$ k is determined by using the following formula:

$$L\{(Y_k+m') \bmod \lfloor N_{CCE,k}/L \rfloor\}+i$$

L is an aggregation level, and a value of L may be 1, 2, 4, or 8, or may be another value; $i=0, \ldots, L-1$; $N_{CCE,k}$ is a quantity (Size) of CCEs in a control region of a subframe k; $m=0, \ldots, M^{(L)}-1$; and $M^{(L)}$ is a quantity of candidate PDCCHs in the search space $S_k^{(L)}$. The search space may be a common search space or a UE-specific search space. For the common search space, $m'=m$, and $Y_k$ is 0. For the UE-specific search space, $Y_k$ is defined as: $Y_k=(A \cdot Y_{k-1}) \bmod D$, where $Y_{-1}=n_{RNTI} \neq 0$, $A=39827$, $D=65537$, $k=\lfloor n_s/2 \rfloor$, and $n_s$ is a serial number of a slot in a subframe (a value range of the serial number may be 0 to 19). When cross-carrier scheduling is not configured for user equipment, $m'=m$. mod is a modulo operator. For example, a correspondence between L, $N_{CCE,k}$, and $M^{(L)}$ may be shown in Table 1 as follows:

TABLE 1

| Search space $S_k^{(L)}$ | | | |
| --- | --- | --- | --- |
| Type of the search space | Aggregation level L | Quantity of CCEs | Quantity $M^{(L)}$ of candidate PDCCHs |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

That is, in the embodiments corresponding to FIG. 3 to FIG. 5, the first device, the second device, or the network device may determine, based on the first radio network temporary identifier, the search space for detecting the target PDCCH.

Optionally, an embodiment of the present invention further provides a physical downlink control channel processing method. In the physical downlink control channel processing method, at least one candidate PDCCH may be further determined from the search space based on a first identifier of the second device. In other words, a quantity of candidate PDCCHs that need to be detected may be further reduced, so that target PDCCH detection complexity is reduced.

For example, in the physical downlink control channel processing method corresponding to FIG. 3, after determining the search space based on the first radio network temporary identifier, the first device may further determine the at least one candidate PDCCH from the search space based on the first identifier of the second device. Correspondingly, that the first device detects a target PDCCH from the search space based on a second radio network temporary identifier may be: detecting, by the first device, the target PDCCH from the at least one candidate PDCCH based on the second radio network temporary identifier.

For another example, in the physical downlink control channel processing method corresponding to FIG. 4, after determining the search space based on the first radio network temporary identifier, the second device may further determine the at least one candidate PDCCH from the search space based on the first identifier of the second device. Correspondingly, that the second device detects a target PDCCH from the search space based on a second radio network temporary identifier may be: detecting, by the second device, the target PDCCH from the at least one candidate PDCCH based on the second radio network temporary identifier.

For another example, in the physical downlink control channel processing method corresponding to FIG. 5, after determining the search space based on the first radio network temporary identifier, the network device may further determine the at least one candidate PDCCH from the search space based on the first identifier of the second device. Correspondingly, that the network device detects a target PDCCH from the at least one candidate PDCCH based on a second radio network temporary identifier may be: sending, by the network device, the target physical downlink control channel on the at least one candidate physical downlink control channel based on the second radio network temporary identifier. Correspondingly, the network device transmits the target PDCCH on a CCE occupied by a specific candidate PDCCH, and the candidate PDCCH is determined by the network device based on a related parameter. This is not limited in this embodiment of the present invention. Transmitting the target PDCCH may be understood as transmitting, on the PDCCH, the downlink control information used to schedule the second device.

It can be learned that in this implementation, after determining the search space, the first device, the second device, and the network device may further determine the at least one candidate PDCCH from the search space based on the first identifier of the second device, and detect or send the target PDCCH on the at least one candidate PDCCH. In this way, a quantity of PDCCH detections by the first device or the second device is reduced, and PDCCH detection complexity is reduced.

The first identifier of the second device may be the second radio network temporary identifier (for example, a C-RNTI or an SL-RNTI), an index of a second identifier of the second device in a target list reported by the first device, a local identifier (Local ID) of the second device, a proximity-services terminal identifier (ProSe UE ID) of the second device, or a layer 2 identifier (Layer-2 ID) of the second device. The second identifier of the second device is the local identifier of the second device, the proximity-services terminal identifier of the second device, or the layer 2 identifier of the second device.

The first identifier of the second device may be the index of the second identifier of the second device in the target list reported by the first device. Specifically, the first device indicates, in the target list, one or more target devices with which the first device communicates, and each target device is identified by using a second identifier. For example, the left column in Table 2 is a target list provided in this embodiment of the present invention. Relay UE indicates, in the target list destinationInfoList, one or more targets destination with which the relay UE performs sidelink communication, and each target destination is identified by a ProSe UE ID. To be specific, the target list destinationInfoList includes one or more ProSe UE IDs, and each remote UE has its own ProSe UE ID. In this case, the first identifier of the second device may be the index of the second identifier of the second device in the target list reported by the first device. For example, a first identifier of remote UE corresponding to a ProSe UE ID 5 is 0.

TABLE 2

| Second identifier of remote UE | First identifier of remote UE |
| --- | --- |
| ProSe UE ID 5 | Index 0 |
| ProSe UE ID 3 | Index 1 |
| ProSe UE ID 4 | Index 2 |

The first device may receive indication information, and the indication information may enable the first device to determine a correspondence between the RNTI of the second device and the first identifier of the second device. It can be learned that upon learning the correspondence, the first device or the network device may determine the at least one candidate PDDCH from the search space.

The first device, the second device, or the network device may determine the at least one candidate PDCCH from the search space based on the first identifier of the second device by using the following formula:

$m \bmod n1 = (\text{identity} \bmod n1)$, where n1 is an integer and $n1 \leq M$; m is an index of each candidate physical downlink control channel in the search space, where m=0, 1, ..., M−1; the identity is the first identifier of the second device; and n1 is predefined, and is configured by the network device or determined by the first device.

For example, a value of n1 may be determined by the first device or the network device based on a quantity of second devices that communicate with the network device by using the first device. The larger the quantity of second devices, the larger n1 may be. When the quantity of second devices is fixed, a larger n1 indicates that RNTIs of a smaller quantity of second devices may be used for detection on each candidate PDCCH. To be specific, the target PDCCH is detected by using the RNTI of the second device in a smaller quantity of time units.

Optionally, the value of n1 may vary depending on an aggregation level of the search space. For example, n1 may be M multiplied by a scale factor k, $0<k\leq 1$. For different aggregation levels, the scale factor remains the same, and may be specified in a standard protocol, or configured by the network device, or determined by the first device.

For example, assuming that n1=2, and m=0, 1, 2, 3, during detection of the target PDCCH of the second device, an index of the at least one candidate PDCCH is obtained based on the first identifier of the second device mod 2. Assuming that the first identifier of the second device mod 2 is equal to 0, candidate PDCCHs that satisfy the foregoing formula are a PDCCH 0 and a PDCCH 2. It can be learned that in this implementation, the target PDCCH may be detected on the PDCCH 0 and the PDCCH 2 by using the RNTI of the second device. To be specific, the PDCCH that carries the information used to schedule the second device is detected.

Figures 6, 7:
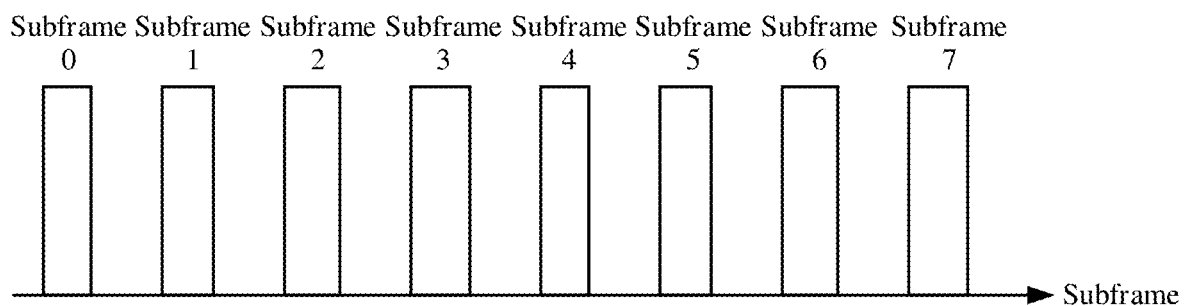
FIG. 6 is a schematic diagram of a search space according to an embodiment of the present invention.
FIG. 7 is a schematic diagram of a non-uplink subframe according to an embodiment of the present invention.

For another example, FIG. 6 is a schematic diagram of a search space according to an embodiment of the present invention. As shown in FIG. 6, it is assumed that m=0, 1, 2, 3, 4, 5, n1=6, and first identifiers of second devices are different identifiers that are consecutively numbered, for example, an identity 0 to an identity 5. In this case, a search space determined by the first device is a PDCCH 0 to a PDCCH 5. The identity 3 mod 6 is equal to 3, and based on this, the first device may detect, on the PDCCH 3 by using an RNTI of a second device identified by the identity 3, a target PDCCH that carries information used to schedule the second device identified by the index 3. Correspondingly, the identity 5 mod 6 is equal to 5, and based on this, the first device may detect, on the PDCCH 5 by using an RNTI of a second device identified by the identity 5, a target PDCCH that carries information used to schedule the second device identified by the identity 5. It can be learned that DCI carried by each candidate PDCCH may be obtained through detection by using a different RNTI.

It can be learned that in this implementation, according to the physical downlink control channel processing method, the target PDCCH is detected on some candidate PDCCHs in the search space, and does not need to be detected on all candidate PDCCHs. To be specific, in this implementation, on a candidate PDCCH m, the target PDCCH needs to be detected by using an RNTI of only a second device identified by an identity that satisfies identity mod n1=m mod n1, and does not need to be detected by using RNTIs of all the second devices. In this way, target PDCCH detection complexity is reduced.

Optionally, an embodiment of the present invention further provides a physical downlink control channel processing method. In the processing method, at least one time unit may be determined based on the first identifier of the second device, and in the at least one time unit, the search space is determined, and the target PDCCH is detected or sent.

In other words, in the physical downlink control channel processing methods shown in FIG. 3 to FIG. 5, before the search space is determined based on the first radio network temporary identifier, the at least one time unit may be further determined based on the first identifier of the second device.

For example, in the physical downlink control channel processing method shown in FIG. 3, the first device may determine the at least one time unit based on the first identifier of the second device, determine the search space in the at least one time unit based on the first radio network temporary identifier, and then detect the target PDCCH in the search space based on the second radio network temporary identifier.

For example, in the physical downlink control channel processing method shown in FIG. 4, the second device determines the at least one time unit based on the first identifier of the second device, determines the search space in the at least one time unit based on the first radio network temporary identifier, and then detects the target PDCCH in the search space based on the second radio network temporary identifier.

For example, in the physical downlink control channel processing method shown in FIG. 5, the network device first determines the at least one time unit based on the first identifier of the second device, determines the search space in the at least one time unit based on the first radio network temporary identifier, and then sends the target PDCCH in the search space based on the second radio network temporary identifier.

In embodiments of the present invention, when the at least one time unit is determined based on the first identifier of the second device, and the search space is determined in the at least one time unit based on the first radio network temporary identifier, correspondingly, the PDCCH that carries the DCI used to schedule the second device further needs to be detected in the search space by using the radio network temporary identifier of the second device corresponding to the first identifier.

The first identifier of the second device may be the second radio network temporary identifier (for example, a C-RNTI or an SL-RNTI), an index of a second identifier of the second device in a target list reported by the first device, a local identifier (Local ID) of the second device, a proximity-services terminal identifier (ProSe UE ID) of the second device, or a layer 2 identifier (Layer-2 ID) of the second device. The second identifier of the second device is the local identifier of the second device, the proximity-services terminal identifier of the second device, or the layer 2 identifier of the second device.

The first identifier of the second device may be the index of the second identifier of the second device in the target list reported by the first device. Specifically, the first device indicates, in the target list, one or more target devices with which the first device communicates, and each target device is identified by using a second identifier. For example, as shown in Table 2, relay UE indicates, in the target list destinationInfoList, one or more targets destination with which the relay UE performs sidelink communication, and each target destination is identified by a ProSe UE ID. To be specific, the target list destinationInfoList includes one or more ProSe UE IDs, and each remote UE has its own ProSe UE ID. In this case, the first identifier of the second device may be the index of the second identifier of the second device in the target list reported by the first device. For example, a first identifier of remote UE corresponding to a ProSe UE ID 5 is 0.

The first device may receive indication information, and the indication information may enable the first device to determine a correspondence between the RNTI of the second device and the first identifier of the second device. It can be learned that upon learning the correspondence, the first device or the network device may determine a time unit in which DCI used to schedule a corresponding second device is located.

Optionally, in this implementation, the at least one time unit may be determined based on the first identifier of the second device by using the following formula:

$$i \bmod n2 = (\text{identity} \bmod n2), \text{ where}$$

n2 is an integer and n2≤N; i is an index of each of a plurality of time units, where i=0, 1, . . . , N−1, and N is a quantity of the plurality of time units; the identity is the first identifier of the second device; and n2 is predefined, and is configured by the network device or determined by the first device. If n2 is determined by the first device, the first device needs to send indication information to the network device, to indicate n2.

N may be a quantity of time units in a period of time, for example, a quantity of downlink subframes in one radio frame, or a quantity of non-uplink subframes in 1024 radio frames, or a quantity of downlink subframes in 1024 radio frames, or a quantity of slots, symbols, mini-slots, or other finer grained time units in one subframe. This is not limited in this embodiment of the present invention.

For example, a value of n2 may be determined by the first device or the network device based on a quantity of second devices that communicate with the network device by using the first device. The larger the quantity of second devices, the larger n2 may be. When the quantity of second devices is fixed, a larger n2 indicates that the target PDCCH may be detected in each time unit by using RNTIs of a smaller quantity of second devices. To be specific, the target PDCCH is detected by using the RNTI of the second device in a smaller quantity of time units.

Optionally, the value of n2 may vary depending on an aggregation level of the search space. For example, n2 may be M multiplied by a scale factor k, 0<k≤1. For different aggregation levels, the scale factor remains the same, and may be specified in a standard protocol, or configured by the network device, or determined by the first device.

For example, assuming that n2=2, and i=0, 1, 2, 3, during detection of the target PDCCH of the second device, an index of at least one non-downlink subframe in which the target PDCCH can be transmitted is obtained based on the first identifier of the second device mod 2. Assuming that the first identifier of the second device mod 2 is equal to 0, non-downlink subframes that satisfy the foregoing formula are a subframe 0 and a subframe 2. It can be learned that in this implementation, the search space may be determined in the subframe 0 and the subframe 2 by using the first radio network temporary identifier, and does not need to be determined in all non-downlink subframes, so that detection complexity is further reduced.

For another example, FIG. 7 is a schematic diagram of a non-uplink subframe according to an embodiment of the present invention. As shown in FIG. 7, it is assumed that i=0, 1, 2, 3, 4, 5, 6, 7, and n2=4. The identity 0 mod 4 is equal to 0, and based on this, the first device may determine the search space in the non-uplink subframe 0 and the non-uplink subframe 4 by using the first radio network temporary identifier, and detect, in the search space by using a radio network temporary identifier of the second device of the identity 0, a PDCCH that carries DCI used to schedule the second device. Correspondingly, the identity 3 mod 6 is equal to 3, and based on this, the first device may determine the search space in the non-uplink subframe 3 and the non-uplink subframe 7 by using the first radio network temporary identifier, and detect, in the search space by using a radio network temporary identifier of the second device of the identity 3, a PDCCH that carries DCI used to schedule the second device.

It can be learned that on one candidate PDCCH in the search space in each time unit, RNTIs of only second devices that have a same value of identity mod n2 need to be used for PDCCH detection or descrambling. To be specific, a PDCCH that carries DCI used to schedule a second device identified by an identity may be detected only in time units that satisfy i mod n2=(identity mod n2), and does not need to be detected in all time units. In this way, PDCCH detection complexity is reduced.

Optionally, an embodiment of the present invention further provides a physical downlink control channel processing method. In the physical downlink control channel processing method, the at least one time unit may be determined by using the first identifier of the second device; the search space is determined in the at least one time unit based on the first radio network temporary identifier; further, the at least one candidate PDCCH is determined from the search space based on the first identifier of the second device; and further, the PDCCH that carries the DCI used to schedule the second device is detected on the at least one candidate PDCCH based on the radio network temporary identifier of the second device. For details, refer to the content described in the foregoing two implementations, and details are not described herein again.

In the foregoing embodiments, when the first radio network temporary identifier is the radio network temporary identifier of the first device, the first radio network temporary identifier may be a radio network temporary identifier used to scramble second downlink control information, and the second downlink control information is information used to schedule uplink transmission or downlink reception of the first device, or is information used to schedule sidelink transmission or sidelink reception of the first device. For example, the first radio network temporary identifier is a cell radio network temporary identifier (C-RNTI) of the first device. The C-RNTI may be used to scramble information used to schedule uplink transmission or downlink reception of the first device. For another example, the first radio network temporary identifier is a sidelink radio network temporary identifier (SL-RNTI) of the first device. The SL-RNTI may be used to scramble information used to schedule sidelink transmission or sidelink reception of the first device.

In the foregoing embodiments, when the first radio network temporary identifier is the radio network temporary identifier of the first device, a payload size of the downlink control information carried by the target physical downlink control channel is equal to a payload size of downlink control information that is in the search space and that is used to schedule the first device. In this way, when detecting the target PDCCH by using the radio network temporary identifier of the second device, the first device may determine that the payload size of the DCI carried by the target PDCCH is equal to the payload size of the DCI used to schedule the first device, that is, may determine to perform, by using the payload size of the DCI used to schedule the first device, a reverse process of rate matching during detection of the target PDCCH, instead of performing a reverse process of rate matching by using payload sizes of pieces of available DCI one by one and then performing descrambling by using the second radio network temporary identifier. In this way, a quantity of detections is reduced, and PDCCH detection complexity is further reduced. For example, if the first device needs to detect, in the search space determined based on the C-RNTI, a PDCCH that carries a DCI format 0, the payload size of the DCI carried by the target PDCCH in the search space determined based on the C-RNTI is equal to a payload size of the DCI format 0.

In the foregoing embodiments, when the first radio network temporary identifier is the radio network temporary identifier of the first device, a payload size of the downlink control information carried by the target physical downlink control channel may have at least two types. For example, the first device needs to detect, in the search space determined based on the C-RNTI, a PDCCH that carries a DCI format 0 and a PDCCH that carries a DCI format 1, and payload sizes of the DCI format 0 and the DCI format 1 are different. In this case, the payload size of the DCI carried by the target PDCCH in the search space determined based on the C-RNTI may be equal to the payload size of the DCI format 0, or may be equal to the payload size of the DCI format 1. In other words, the DCI carried by the target PDCCH may have two payload sizes. The DCI information carried by the target PDCCH may be padded with 0, so that the payload sizes are equal.

In still another implementation, the first device may separately determine at least two search spaces based on radio network temporary identifiers of at least two first devices, where each search space is a set of M candidate physical downlink control channels, M is an integer greater than or equal to 1, and a value of M may be different for each search space; and detect a target physical downlink control channel from the at least two search spaces based on the second radio network temporary identifier, where the second radio network temporary identifier is the radio network temporary identifier of the second device, the first downlink control information carried by the target physical downlink control channel is information that is scrambled by using the second radio network temporary identifier and that is used to schedule the second device, and the second device communicates with a network by using the first device.

For example, the first device may determine two search spaces based on the C-RNTI and the SL-RNTI, respectively, and detect a target physical downlink control channel from the two search spaces based on the second radio network temporary identifier.

Optionally, at least one candidate physical downlink control channel may be determined from each of the at least two search spaces based on the first identifier of the second device, and the target physical downlink control channel is detected on the at least one candidate physical downlink control channel by using the second radio network temporary identifier.

Optionally, before determining the at least two search spaces based on the radio network temporary identifiers of the at least two first devices, the first device may further determine at least one time unit based on the first identifier of the second device, where the at least one time unit includes the PDCCH that carries the information used to schedule the second device. Correspondingly, the first device may determine the at least two search spaces in the at least one time unit based on the radio network temporary identifiers of the at least two first devices, and further detect a target PDCCH in each of the at least two search spaces based on the second radio network temporary identifier.

Optionally, a payload size of downlink control information carried by the target physical downlink control channel is equal to a payload size of downlink control information that is in the at least two search spaces and that is used to schedule the first device. A payload size of downlink control information carried by the target physical downlink control channel in each search space is equal to a payload size of downlink control information that is in the search space and that is used to schedule the first device.

For example, the first device may determine two search spaces based on the C-RNTI and the SL-RNTI, respectively. If the first device needs to detect, in the search space determined based on the C-RNTI, a PDCCH that carries a DCI format 0, a payload size of the DCI carried by the target PDCCH in the search space determined based on the C-RNTI is equal to a payload size of the DCI format 0. If the first device needs to detect, in the search space determined based on the SL-RNTI, a PDCCH that carries a DCI format 5, a payload size of the DCI carried by the target PDCCH in the search space determined based on the SL-RNTI is equal to a payload size of the DCI format 5. In other words, the DCI carried by the target PDCCH may have two payload sizes.

Figure 8:
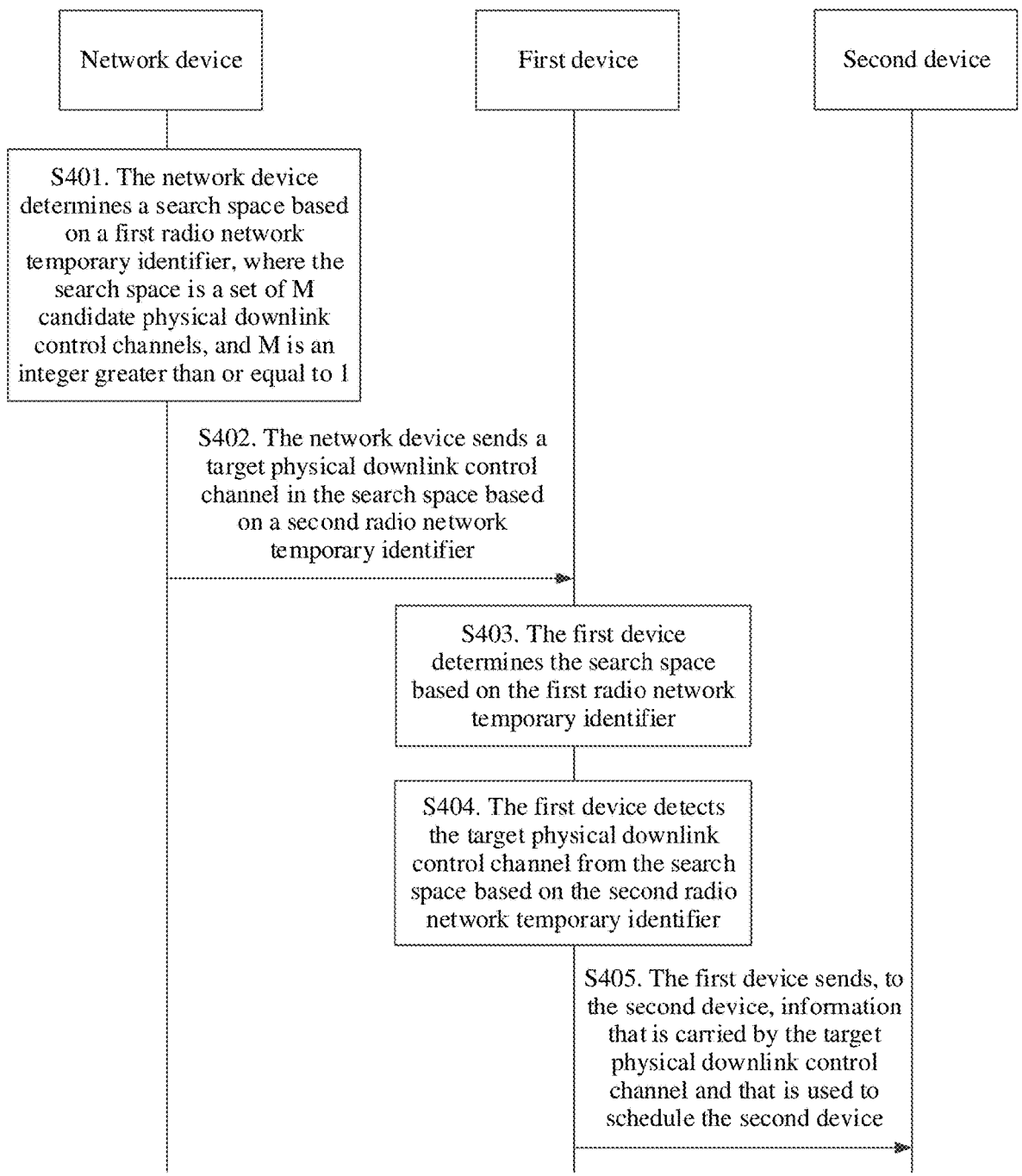
FIG. 8 is a schematic flowchart of yet another physical downlink control channel processing method according to an embodiment of the present invention.

FIG. 8 is a schematic flowchart of yet another physical downlink control channel processing method according to an embodiment of the present invention. The processing method shown in FIG. 8 is interactively performed by a network device, a first device, and a second device. As shown in FIG. 8, the processing method includes the following steps:

S401. The network device determines a search space based on a first radio network temporary identifier, where the search space is a set of M candidate physical downlink control channels, and M is an integer greater than or equal to 1.

S402. The network device sends a target physical downlink control channel in the search space based on a second radio network temporary identifier.

S403. The first device determines the search space based on the first radio network temporary identifier.

S404. The first device detects the target physical downlink control channel from the search space based on the second radio network temporary identifier.

S405. The first device sends, to the second device, information that is carried by the target physical downlink control channel and that is used to schedule the second device.

The first radio network temporary identifier is a radio network temporary identifier of the first device or the second device, the second radio network temporary identifier is the radio network temporary identifier of the second device, first downlink control information carried by the target physical downlink control channel is information that is scrambled by using the second radio network temporary identifier and that is used to schedule the second device, and the second device communicates with a network by using the first device.

After obtaining the DCI, the first device may send scheduling information indicated by the DCI to the second device by using other control signaling, for example, sidelink control information (SCI). For another example, the first device sends other control signaling to remote UE, where the other control signaling indicates the scheduling information.

An implementation of this embodiment may refer to the implementations of the foregoing embodiments. For example, the network device may determine at least one candidate physical downlink control channel from the search space based on a first identifier of the second device, and detect the target physical downlink control channel on the at least one candidate physical downlink control channel based on the second radio network temporary identifier, to further reduce detection complexity.

For another example, correspondingly, the first device may determine at least one time unit based on the first identifier of the second device, and determine the search space in the at least one time unit based on the first radio network temporary identifier. Details are not described herein again.

The first identifier of the second device is the second radio network temporary identifier, an index of a second identifier of the second device in a target list reported by the first device, a local identifier of the second device, a proximity-services terminal identifier of the second device, or a layer 2 identifier of the second device. The second identifier of the second device is the local identifier of the second device, the proximity-services terminal identifier of the second device, or the layer 2 identifier of the second device. For details, refer to related descriptions in the implementations of the foregoing embodiments. Details are not described herein again.

When the first radio network temporary identifier is a radio network temporary identifier of the first device, the first radio network temporary identifier is a radio network temporary identifier used to scramble second downlink control information, and the second downlink control information is information used to schedule uplink transmission or downlink reception of the first device, or is information used to schedule sidelink transmission or sidelink reception of the first device. For details, refer to related descriptions in the implementations of the foregoing embodiments. Details are not described herein again.

When the first radio network temporary identifier is a radio network temporary identifier of the first device, a payload size of the downlink control information carried by the target physical downlink control channel is equal to a payload size of downlink control information used to schedule the first device in the search space. For details, refer to related descriptions in the implementations of the foregoing embodiments. Details are not described herein again.

It can be learned that, compared with the current practice that the target PDCCH is detected on an entire system bandwidth by using only the RNTI of the second device, this embodiment of the present invention can greatly reduce detection complexity.

An embodiment of the present invention further provides related content of a physical downlink control channel processing method when at least two second devices communicate with a network by using a first device.

For example, the at least two second devices are a second device A and a second device B. In an implementation, when the first device determines a search space based on a radio network temporary identifier of the first device, the physical downlink control channel detection method may include:

determining, by a network device, the search space based on the radio network temporary identifier of the first device, where the search space is a set of M candidate physical downlink control channels, and M is an integer greater than or equal to 1;

sending, by the network device, a first target physical downlink control channel in the search space based on a radio network temporary identifier of the second device A, and sending a second target physical downlink control channel in the search space based on a radio network temporary identifier of the second device B, where downlink control information carried by the first target physical downlink control channel is information that is scrambled by using the radio network temporary identifier of the second device A and that is used to schedule the second device A, and downlink control information carried by the second target physical downlink control channel is information that is scrambled by using the radio network temporary identifier of the second device B and that is used to schedule the second device B;

determining, by the first device, the search space based on the radio network temporary identifier of the first device;

detecting, by the first device, the first target physical downlink control channel from the search space based on the radio network temporary identifier of the second device A, and detecting the second target physical downlink control channel from the search space based on the radio network temporary identifier of the second device B;

obtaining, by the first device from the first target physical downlink control channel, the information used to schedule the second device A, and obtaining, from the second target physical downlink control channel, the information used to schedule the second device B; and sending, by the first device, the information used to schedule the second device A to the second device A, and sending the information used to schedule the second device B to the second device B.

In this implementation, the first device may determine a same search space for all second devices, so that a quantity of times of determining the search space is reduced, a range of the search space in which the first device detects the physical downlink control channel is narrowed down, and complexity of physical downlink control channel detection by the first device is reduced. Correspondingly, in the same search space, a radio network temporary identifier of each second device needs to be used to separately detect a physical downlink control channel that carries information used to schedule the corresponding second device.

Optionally, in this embodiment, for each second device, the first device or the network device may further determine a subset including at least one candidate physical downlink control channel from the search space based on a first identifier of the second device, and then detect, on the at least one candidate physical downlink control channel included in the subset based on a radio network temporary identifier of the second device, a target physical downlink control channel that carries information used to schedule the second device. In this implementation, a quantity of PDCCHs to be detected by using the radio network temporary identifier of the second device can be reduced. Therefore, detection complexity of the first device can be reduced.

For example, the first device determines, from the search space based on a first identifier of the second device A, a first subset including at least one candidate physical downlink control channel, and then detects, based on the radio network temporary identifier of the second device A, the first target physical downlink control channel on the at least one candidate physical downlink control channel included in the first subset. Correspondingly, the first device determines, from the search space based on a first identifier of the second device B, a second subset including at least one candidate physical downlink control channel, and then detects, based on the radio network temporary identifier of the second device B, the second target physical downlink control channel on the at least one candidate physical downlink control channel included in the second subset. Correspondingly, the network device determines the first subset from the search space based on the first identifier of the second device A, and then sends the first target physical downlink control channel in the first subset based on the radio network temporary identifier of the second device A; and the network device determines the second subset from the search space based on the first identifier of the second device B, and then sends the second target physical downlink control channel in the second subset based on the radio network temporary identifier of the second device B.

Optionally, for a manner of determining the at least one candidate physical downlink control channel from the search space based on the first identifier of the second device, refer to related descriptions in the foregoing embodiment. Details are not described herein again.

Optionally, in this embodiment, for each second device, the first device or the network device may further determine, based on the first identifier of the second device, a time unit set that includes at least one time unit, and then determine, based on the radio network temporary identifier of the first device, the search space in the at least one time unit included in the time unit set.

For example, the first device determines, based on the first identifier of the second device A, a first time unit set that includes at least one time unit, and determines, based on the first identifier of the second device B, a second time unit set that includes at least one time unit; and then based on the radio network temporary identifier of the first device, determines a first search space of the second device A in the first time unit set, and determines a second search space of the second device B in the second time unit set. Correspondingly, the first device detects the first target physical downlink control channel in the first search space based on the radio network temporary identifier of the second device A, and detects the second target physical downlink control channel in the second search space based on the radio network temporary identifier of the second device B.

Correspondingly, the network device determines the first time unit set based on the first identifier of the second device A, and determines the second time unit set based on the first identifier of the second device B; then determines the first search space in the first time unit set based on the radio network temporary identifier of the first device, and sends the first target physical downlink control channel in the first search space based on the radio network temporary identifier of the second device A; and determines the second search space in the second time unit set based on the radio network temporary identifier of the first device, and sends the second target physical downlink control channel in the second search space based on the radio network temporary identifier of the second device B.

It can be learned that in this implementation, for each second device, a target PDCCH that carries information used to schedule the second device needs to be detected in only some time units, so that detection complexity of the first device is reduced.

Optionally, for a manner of determining the at least one time unit based on the first identifier of the second device, refer to related descriptions in the foregoing embodiment. Details are not described herein again.

The first identifier of the second device may be the second radio network temporary identifier (for example, a C-RNTI or an SL-RNTI), an index of a second identifier of the second device in a target list reported by the first device, a local identifier (Local ID) of the second device, a proximity-services terminal identifier (ProSe UE ID) of the second device, or a layer 2 identifier (Layer-2 ID) of the second device. The second identifier of the second device is the local identifier of the second device, the proximity-services terminal identifier of the second device, or the layer 2 identifier of the second device. Correspondingly, for this implementation, refer to related descriptions in the foregoing embodiment. Details are not described herein again.

When the first radio network temporary identifier is the radio network temporary identifier of the first device, the first radio network temporary identifier may be a radio network temporary identifier used to scramble second downlink control information, and the second downlink control information is information used to schedule uplink transmission or downlink reception of the first device, or is information used to schedule sidelink transmission or sidelink reception of the first device. Correspondingly, for this implementation, refer to related descriptions in the foregoing embodiments. Details are not described herein again.

When the first radio network temporary identifier is the radio network temporary identifier of the first device, a payload size of the downlink control information carried by the target physical downlink control channel is equal to a payload size of downlink control information that is in the search space and that is used to schedule the first device. In this way, when detecting the target PDCCH by using the radio network temporary identifier of the second device, the first device may determine that the payload size of the DCI carried by the target PDCCH is equal to the payload size of the DCI used to schedule the first device, that is, may determine to perform, by using the payload size of the DCI used to schedule the first device, a reverse process of rate matching during detection of the target PDCCH, instead of performing a reverse process of rate matching by using payload sizes of pieces of available DCI one by one and then performing descrambling by using the second radio network temporary identifier. In this way, a quantity of detections is reduced, and PDCCH detection complexity is further reduced. Correspondingly, for this implementation, refer to related descriptions in the foregoing embodiment. Details are not described herein again.

For the foregoing operations, refer to related descriptions in the implementations of the foregoing embodiments. Details are not described herein again.

For another example, the at least two second devices are a second device A and a second device B. In another implementation, when the second device determines a search space based on a radio network temporary identifier of the first device, the physical downlink control channel detection method may include:

determining, by a network device, the search space based on the radio network temporary identifier of the first device, where the search space is a set of M candidate physical downlink control channels, and M is an integer greater than or equal to 1;

sending, by the network device, a first target physical downlink control channel in the search space based on a radio network temporary identifier of the second device A, and sending a second target physical downlink control channel in the search space based on a radio network temporary identifier of the second device B, where downlink control information carried by the first target physical downlink control channel is information that is scrambled by using the radio network temporary identifier of the second device A and that is used to schedule the second device A, and downlink control information carried by the second target physical downlink control channel is information that is scrambled by using the radio network temporary identifier of the second device B and that is used to schedule the second device B;

separately obtaining, by the second device A and the second device B, the radio network temporary identifier of the first device;

separately determining, by the second device A and the second device B, the search space based on the radio network temporary identifier of the first device;

detecting, by the second device A, the first target physical downlink control channel from the search space based on the radio network temporary identifier of the second device A, and detecting, by the second device B, the second target physical downlink control channel from the search space based on the radio network temporary identifier of the second device B; and obtaining, by the second device A, the information used to schedule the second device A from the first target physical downlink control channel, and obtaining, by the second device B, the information used to schedule the second device B from the second target physical downlink control channel.

It can be learned that, when the at least two second devices communicate with a network by using the first device, in both the foregoing implementations, the search space may be first determined, and then the corresponding PDCCH is detected, so that PDCCH detection complexity is reduced.

Optionally, in this embodiment, for each second device, the second device or the network device may determine, from the search space based on a first identifier of the second device, a subset including at least one candidate physical downlink control channel, and then detect, on the at least one candidate physical downlink control channel included in the subset based on a radio network temporary identifier of the second device, a target physical downlink control channel that carries information used to schedule the second device. In this implementation, a quantity of PDCCHs to be detected by using the radio network temporary identifier of the second device can be reduced. Therefore, detection complexity of the second device can be reduced.

For example, the second device A determines, from the search space based on a first identifier of the second device A, a first subset including at least one candidate physical downlink control channel, and then detects, based on the radio network temporary identifier of the second device A, the first target physical downlink control channel on the at least one candidate physical downlink control channel included in the first subset. Correspondingly, the second device B determines, from the search space based on a first identifier of the second device B, a second subset including at least one candidate physical downlink control channel, and then detects, based on the radio network temporary identifier of the second device B, the second target physical downlink control channel on the at least one candidate physical downlink control channel included in the second subset. Correspondingly, the network device determines the first subset from the search space based on the first identifier of the second device A, and then sends the first target physical downlink control channel in the first subset based on the radio network temporary identifier of the second device A; and the network device determines the second subset from the search space based on the first identifier of the second device B, and then sends the second target physical downlink control channel in the second subset based on the radio network temporary identifier of the second device B.

Optionally, in this embodiment, for an implementation of determining the at least one candidate physical downlink control channel from the search space based on the first identifier of the second device, refer to related descriptions in the foregoing embodiments. Details are not described herein again.

Optionally, in this embodiment, for each second device, the second device or the network device may further determine, based on the first identifier of the second device, a time unit set that includes at least one time unit, and then determine, based on the radio network temporary identifier of the first device, the search space of the second device in the at least one time unit included in the time unit set. It can be learned that in this implementation, for each second device, a target PDCCH that carries information used to schedule the second device needs to be detected in only some time units, so that detection complexity of the first device is reduced.

For example, the second device A determines, based on the first identifier of the second device A, a first time unit set that includes at least one time unit, determines a first search space of the second device A in the first time unit set based on the radio network temporary identifier of the first device, and then detects the first target physical downlink control channel in the first search space based on the radio network temporary identifier of the second device A. Correspondingly, the second device B determines, based on the first identifier of the second device B, a second time unit set that includes at least one time unit, determines a second search space of the second device B in the second time unit set based on the radio network temporary identifier of the first device, and then detects the second target physical downlink control channel in the second search space based on the radio network temporary identifier of the second device B.

Correspondingly, the network device determines the first time unit set based on the first identifier of the second device A, determines the first search space in the first time unit set based on the radio network temporary identifier of the first device, and sends the first target physical downlink control channel in the first search space based on the radio network temporary identifier of the second device A. The network device determines the second time unit set based on the first identifier of the second device B, determines the second search space in the second time unit set based on the radio network temporary identifier of the first device, and sends the second target physical downlink control channel in the second search space based on the radio network temporary identifier of the second device B.

Optionally, for a manner of determining the at least one time unit based on the first identifier of the second device, refer to related descriptions in the foregoing embodiment. Details are not described herein again.

The first identifier of the second device may be the second radio network temporary identifier (for example, a C-RNTI or an SL-RNTI), an index of a second identifier of the second device in a target list reported by the first device, a local identifier (Local ID) of the second device, a proximity-services terminal identifier (ProSe UE ID) of the second device, or a layer 2 identifier (Layer-2 ID) of the second device. The second identifier of the second device is the local identifier of the second device, the proximity-services terminal identifier of the second device, or the layer 2 identifier of the second device. Correspondingly, for this implementation, refer to related descriptions in the foregoing embodiment. Details are not described herein again.

When the first radio network temporary identifier is the radio network temporary identifier of the first device, the first radio network temporary identifier may be a radio network temporary identifier used to scramble second downlink control information, and the second downlink control information is information used to schedule uplink transmission or downlink reception of the first device, or is information used to schedule sidelink transmission or sidelink reception of the first device. Correspondingly, for this implementation, refer to related descriptions in the foregoing embodiment. Details are not described herein again.

When the first radio network temporary identifier is the radio network temporary identifier of the first device, a payload size of the downlink control information carried by the target physical downlink control channel is equal to a payload size of downlink control information that is in the search space and that is used to schedule the first device. In this way, when detecting the target PDCCH by using the radio network temporary identifier of the second device, the first device may determine that the payload size of the DCI carried by the target PDCCH is equal to the payload size of the DCI used to schedule the first device, that is, may determine to perform, by using the payload size of the DCI used to schedule the first device, a reverse process of rate matching during detection of the target PDCCH, instead of performing a reverse process of rate matching by using payload sizes of pieces of available DCI one by one and then performing descrambling by using the second radio network temporary identifier. In this way, a quantity of detections is reduced, and PDCCH detection complexity is further reduced. Correspondingly, for this implementation, refer to related descriptions in the foregoing embodiment. Details are not described herein again.

Specifically, for the foregoing operations, refer to related descriptions in the implementations of the foregoing embodiments. Details are not described herein again.

For still another example, the at least two second devices are a second device A and a second device B. In still another implementation, for each second device, when the first device determines a search space based on a radio network temporary identifier of the second device, the physical downlink control channel detection method may include:

determining, by a network device, a first search space based on a radio network temporary identifier of the second device A, and determining a second search space based on a radio network temporary identifier of the second device B, where the first search space is a set of M1 candidate physical downlink control channels, and M1 is an integer greater than or equal to 1; the second search space is a set of M2 candidate physical downlink control channels, and M2 is an integer greater than or equal to 1;

sending, by the network device, a first target physical downlink control channel in the first search space based on the radio network temporary identifier of the second device A, and sending a second target physical downlink control channel in the second search space based on the radio network temporary identifier of the second device B, where downlink control information carried by the first target physical downlink control channel is information that is scrambled by using the radio network temporary identifier of the second device A and that is used to schedule the second device A; and downlink control information carried by the second target physical downlink control channel is information that is scrambled by using the radio network temporary identifier of the second device B and that is used to schedule the second device B;

determining, by the first device, the first search space based on the radio network temporary identifier of the second device A, and determining the second search space based on the radio network temporary identifier of the second device B;

detecting, by the first device, the first target physical downlink control channel from the first search space based on the radio network temporary identifier of the second device A, and detecting the second target physical downlink control channel from the second search space based on the radio network temporary identifier of the second device B;

obtaining, by the first device from the first target physical downlink control channel, the information used to schedule the second device A, and obtaining, from the second target physical downlink control channel, the information used to schedule the second device B; and sending, by the first device, the information used to schedule the second device A to the second device A, and sending the information used to schedule the second device B to the second device B.

In this embodiment, for each second device, the first device or the network device may further determine a subset including at least one candidate physical downlink control channel from the search space of the second device based on a first identifier of the second device, and then detect, on the at least one candidate physical downlink control channel included in the subset based on a radio network temporary identifier of the second device, a target physical downlink control channel that carries information used to schedule the second device. In this implementation, a quantity of PDCCHs to be detected by using the radio network temporary identifier of the second device can be reduced. Therefore, detection complexity of the first device can be reduced.

For example, the first device determines, from the first search space based on a first identifier of the second device A, a first subset including at least one candidate physical downlink control channel, and then detects, based on the radio network temporary identifier of the second device A, the first target physical downlink control channel on the at least one candidate physical downlink control channel included in the first subset. Correspondingly, the first device determines, from the second search space based on a first identifier of the second device B, a second subset including at least one candidate physical downlink control channel, and then detects, based on the radio network temporary identifier of the second device B, the second target physical downlink control channel on the at least one candidate physical downlink control channel included in the second subset.

Correspondingly, the network device determines the first subset from the first search space based on the first identifier of the second device A, and then sends the first target physical downlink control channel in the first subset based on the radio network temporary identifier of the second device A. In addition, the network device determines the second subset from the second search space based on the first identifier of the second device B, and then sends the second target physical downlink control channel in the second subset based on the radio network temporary identifier of the second device B.

Optionally, for each second device, for a manner of determining the at least one candidate physical downlink control channel from the search space of the second device based on the first identifier of the second device, refer to related descriptions in the foregoing embodiment. Details are not described herein again.

Optionally, in this embodiment, for each second device, the first device or the network device may further determine, based on the first identifier of the second device, a time unit set that includes at least one time unit, and then determine, based on the radio network temporary identifier of the second device, the search space of the second device in the at least one time unit included in the time unit set. In this implementation, for each second device, a target PDCCH that carries information used to schedule the second device needs to be detected in only some time units, so that detection complexity of the first device is reduced.

For example, the first device determines, based on the first identifier of the second device A, a first time unit set that includes at least one time unit, and then determines the first search space of the second device A in the first time unit set based on the radio network temporary identifier of the second device A. Correspondingly, the first device determines, based on the first identifier of the second device B, a second time unit set that includes at least one time unit, and then determines the second search space of the second device B in the second time unit set based on the radio network temporary identifier of the second device B. Correspondingly, the first device detects the first target physical downlink control channel in the first search space based on the radio network temporary identifier of the second device A, and the first device detects the second target physical downlink control channel in the second search space based on the radio network temporary identifier of the second device B.

Correspondingly, the network device determines the first time unit set based on the first identifier of the second device A, determines the first search space in the first time unit set based on the radio network temporary identifier of the second device A, and then sends the first target physical downlink control channel in the first search space based on the radio network temporary identifier of the second device A. In addition, the network device determines the second time unit set based on the first identifier of the second device B, determines the second search space in the second time unit set based on the radio network temporary identifier of the second device B, and then sends the second target physical downlink control channel in the second search space based on the radio network temporary identifier of the second device B.

Optionally, for a manner of determining the at least one time unit based on the first identifier of the second device, refer to related descriptions in the foregoing embodiment. Details are not described herein again.

The first identifier of the second device may be the second radio network temporary identifier (for example, a C-RNTI or an SL-RNTI), an index of a second identifier of the second device in a target list reported by the first device, a local identifier (Local ID) of the second device, a proximity-services terminal identifier (ProSe UE ID) of the second device, or a layer 2 identifier (Layer-2 ID) of the second device. The second identifier of the second device is the local identifier of the second device, the proximity-services terminal identifier of the second device, or the layer 2 identifier of the second device. Correspondingly, for this implementation, refer to related descriptions in the foregoing embodiment. Details are not described herein again.

When the first radio network temporary identifier is the radio network temporary identifier of the first device, the first radio network temporary identifier may be a radio network temporary identifier used to scramble second downlink control information, and the second downlink control information is information used to schedule uplink transmission or downlink reception of the first device, or is information used to schedule sidelink transmission or sidelink reception of the first device. Correspondingly, for this implementation, refer to related descriptions in the foregoing embodiment. Details are not described herein again.

When the first radio network temporary identifier is the radio network temporary identifier of the first device, a payload size of the downlink control information carried by the target physical downlink control channel is equal to a payload size of downlink control information that is in the search space and that is used to schedule the first device. In this way, when detecting the target PDCCH by using the radio network temporary identifier of the second device, the first device may determine that the payload size of the DCI carried by the target PDCCH is equal to the payload size of the DCI used to schedule the first device, that is, may determine to perform, by using the payload size of the DCI used to schedule the first device, a reverse process of rate matching during detection of the target PDCCH, instead of performing a reverse process of rate matching by using payload sizes of pieces of available DCI one by one and then performing descrambling by using the second radio network temporary identifier. In this way, a quantity of detections is reduced, and PDCCH detection complexity is further reduced. Correspondingly, for this implementation, refer to related descriptions in the foregoing embodiment. Details are not described herein again.

Specifically, for the foregoing operations, refer to related descriptions in the implementations of the foregoing embodiments. Details are not described herein again.

For yet another example, the at least two second devices are a second device A and a second device B. In yet another implementation, for each second device, when the second device determines a search space based on a radio network temporary identifier of the second device, the physical downlink control channel detection method may include:

determining, by a network device, a first search space based on a radio network temporary identifier of the second device A, and determining a first search space based on a radio network temporary identifier of the second device B, where the first search space is a set of M1 candidate physical downlink control channels, and M1 is an integer greater than or equal to 1; the second search space is a set of M2 candidate physical downlink control channels, and M2 is an integer greater than or equal to 1;

sending, by the network device, a first target physical downlink control channel in the search space based on the radio network temporary identifier of the second device A, and sending a second target physical downlink control channel in the search space based on the radio network temporary identifier of the second device B, where downlink control information carried by the first target physical downlink control channel is information that is scrambled by using the radio network temporary identifier of the second device A and that is used to schedule the second device A, and downlink control information carried by the second target physical downlink control channel is information that is scrambled by using the radio network temporary identifier of the second device B and that is used to schedule the second device B;

determining, by the second device A, the first search space based on the radio network temporary identifier of the second device A, and determining, by the second device B, the second search space based on the radio network temporary identifier of the second device B;

detecting, by the second device A, the first target physical downlink control channel from the first search space based on the radio network temporary identifier of the second device A, and detecting, by the second device B, the second target physical downlink control channel from the second search space based on the radio network temporary identifier of the second device B; and obtaining, by the second device A, the information used to schedule the second device A from the first target physical downlink control channel, and obtaining, by the second device B, the information used to schedule the second device B from the second target physical downlink control channel.

In this embodiment, for each second device, the second device or the network device may further determine a subset including at least one candidate physical downlink control channel from the search space of the second device based on a first identifier of the second device, and then detect, on the at least one candidate physical downlink control channel included in the subset based on a radio network temporary identifier of the second device, a target physical downlink control channel that carries information used to schedule the second device. In this implementation, a quantity of PDCCHs to be detected by using the radio network temporary identifier of the second device can be reduced. Therefore, detection complexity of the first device can be reduced.

For example, the second device A determines, from the first search space based on a first identifier of the second device A, a first subset including at least one candidate physical downlink control channel, and then detects, based on the radio network temporary identifier of the second device A, the first target physical downlink control channel on the at least one candidate physical downlink control channel included in the first subset. Correspondingly, the second device B determines, from the second search space based on a first identifier of the second device B, a second subset including at least one candidate physical downlink control channel, and then detects, based on the radio network temporary identifier of the second device B, the second target physical downlink control channel on the at least one candidate physical downlink control channel included in the second subset. Correspondingly, the network device determines the first subset from the first search space based on the first identifier of the second device A, and then sends the first target physical downlink control channel in the first subset based on the radio network temporary identifier of the second device A. In addition, the network device determines the second subset from the second search space based on the first identifier of the second device B, and then sends the second target physical downlink control channel in the second subset based on the radio network temporary identifier of the second device B.

Optionally, for each second device, for a manner of determining the at least one candidate physical downlink control channel from the search space of the second device based on the first identifier of the second device, refer to related descriptions in the foregoing embodiment. Details are not described herein again.

Optionally, in this embodiment, for each second device, the second device or the network device may further determine, based on the first identifier of the second device, a time unit set that includes at least one time unit, and then determine, based on the radio network temporary identifier of the second device, the search space of the second device in the at least one time unit included in the time unit set.

For example, the second device A determines, based on the first identifier of the second device A, a first time unit set that includes at least one time unit, and then determines the first search space of the second device A in the first time unit set based on the radio network temporary identifier of the second device A. Correspondingly, the second device B determines, based on the first identifier of the second device B, a second time unit set that includes at least one time unit, and then determines the second search space of the second device B in the second time unit set based on the radio network temporary identifier of the second device B. Correspondingly, the second device A detects the first target physical downlink control channel in the first search space based on the radio network temporary identifier of the second device A, and the second device B detects the second target physical downlink control channel in the second search space based on the radio network temporary identifier of the second device B.

Correspondingly, the network device determines the first time unit set based on the first identifier of the second device A, determines the first search space in the first time unit set based on the radio network temporary identifier of the second device A, and then sends the first target physical downlink control channel in the first search space based on the radio network temporary identifier of the second device A. In addition, the network device determines the second time unit set based on the first identifier of the second device B, determines the second search space in the second time unit set based on the radio network temporary identifier of the second device B, and then sends the second target physical downlink control channel in the second search space based on the radio network temporary identifier of the second device B.

It can be learned that in this implementation, for each second device, a target PDCCH that carries information used to schedule the second device needs to be detected in only some time units, so that detection complexity of the first device is reduced.

Optionally, for a manner of determining the at least one time unit based on the first identifier of the second device, refer to related descriptions in the foregoing embodiment. Details are not described herein again.

The first identifier of the second device may be the second radio network temporary identifier (for example, a C-RNTI or an SL-RNTI), an index of a second identifier of the second device in a target list reported by the first device, a local identifier (Local ID) of the second device, a proximity-services terminal identifier (ProSe UE ID) of the second device, or a layer 2 identifier (Layer-2 ID) of the second device. The second identifier of the second device is the local identifier of the second device, the proximity-services terminal identifier of the second device, or the layer 2 identifier of the second device. Correspondingly, for this implementation, refer to related descriptions in the foregoing embodiment. Details are not described herein again.

When the first radio network temporary identifier is the radio network temporary identifier of the first device, the first radio network temporary identifier may be a radio network temporary identifier used to scramble second downlink control information, and the second downlink control information is information used to schedule uplink transmission or downlink reception of the first device, or is information used to schedule sidelink transmission or sidelink reception of the first device. Correspondingly, for this implementation, refer to related descriptions in the foregoing embodiment. Details are not described herein again.

When the first radio network temporary identifier is the radio network temporary identifier of the first device, a payload size of the downlink control information carried by the target physical downlink control channel is equal to a payload size of downlink control information that is in the search space and that is used to schedule the first device. In this way, when detecting the target PDCCH by using the radio network temporary identifier of the second device, the first device may determine that the payload size of the DCI carried by the target PDCCH is equal to the payload size of the DCI used to schedule the first device, that is, may determine to perform, by using the payload size of the DCI used to schedule the first device, a reverse process of rate matching during detection of the target PDCCH, instead of performing a reverse process of rate matching by using payload sizes of pieces of available DCI one by one and then performing descrambling by using the second radio network temporary identifier. In this way, a quantity of detections is reduced, and PDCCH detection complexity is further reduced. Correspondingly, for this implementation, refer to related descriptions in the foregoing embodiment. Details are not described herein again.

Specifically, for the foregoing operations, refer to related descriptions in the implementations of the foregoing embodiments. Details are not described herein again.

Figure 9:
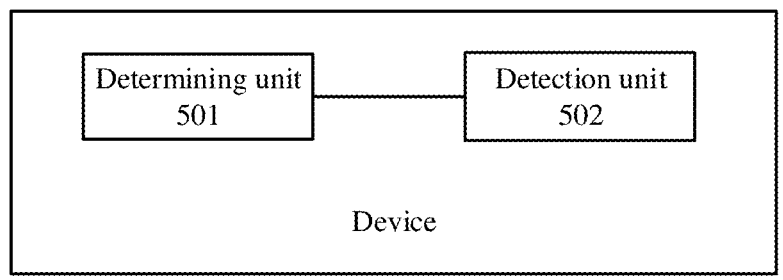
FIG. 9 is a schematic structural diagram of a device according to an embodiment of the present invention.

FIG. 9 is a schematic structural diagram of a device according to an embodiment of the present invention. As shown in FIG. 9, the terminal device may include a determining unit 501 and a detection unit 502.

The determining unit 501 is configured to determine a search space based on a first radio network temporary identifier, where the search space is a set of M candidate physical downlink control channels, and M is an integer greater than or equal to 1.

The detection unit 502 is configured to detect a target physical downlink control channel from the search space based on a second radio network temporary identifier.

The first radio network temporary identifier is a radio network temporary identifier of a first device or a second device, the second radio network temporary identifier is the radio network temporary identifier of the second device, first downlink control information carried by the target physical downlink control channel is information that is scrambled by using the second radio network temporary identifier and that is used to schedule the second device, and the second device communicates with a network by using the first device.

The determining unit 501 and the detection unit 502 may perform corresponding operations performed by the first device or the second device in the foregoing embodiments and implementations, and details are not described herein again.

Figure 10:
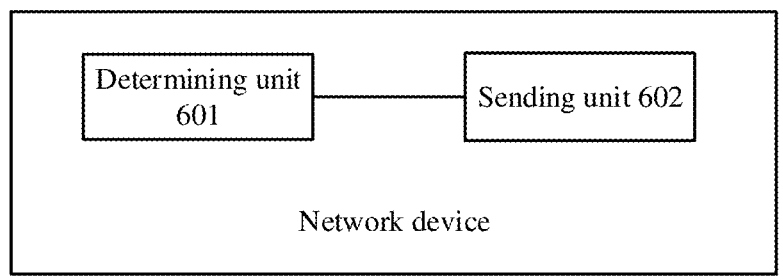
FIG. 10 is a schematic structural diagram of a network device according to an embodiment of the present invention.

FIG. 10 is a schematic structural diagram of a network device according to an embodiment of the present invention. As shown in FIG. 10, the network device may include a determining unit 601 and a sending unit 602.

The determining unit 601 is configured to determine a search space based on a first radio network temporary identifier, where the search space is a set of M candidate physical downlink control channels, and M is an integer greater than or equal to 1.

The sending unit 602 is configured to send a target physical downlink control channel in the search space based on a second radio network temporary identifier.

The first radio network temporary identifier is a radio network temporary identifier of a first device or a second device, first downlink control information carried by the target physical downlink control channel is information that is scrambled by using the second radio network temporary identifier and that is used to schedule the second device, the second radio network temporary identifier is the radio network temporary identifier of the second device, and the second device communicates with a network by using the first device.

The determining unit 601 and the sending unit 602 may perform steps or operations performed by the network device in the foregoing embodiments and implementations, and details are not described herein again.

Figure 11:
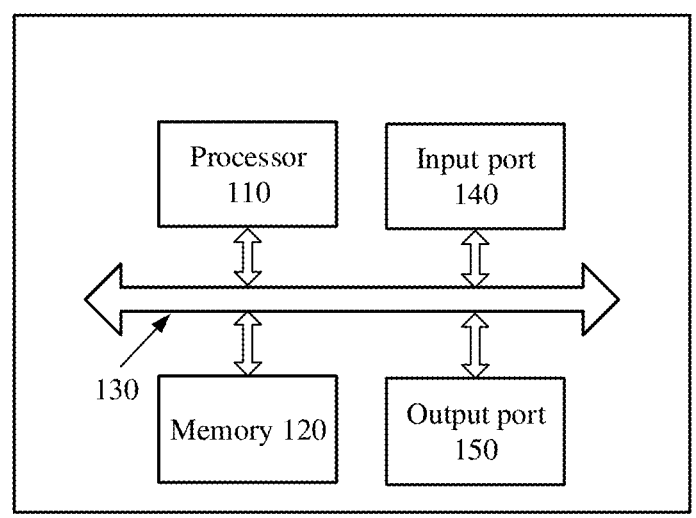
FIG. 11 is a schematic diagram 1 of a device according to an embodiment of the present invention.

According to the foregoing methods, FIG. 11 is a schematic diagram 1 of a device according to an embodiment of the present invention. As shown in FIG. 11, the device may be a first device, or may be a second device, or may be a chip or a circuit, for example, a chip or a circuit that may be disposed on the first device or the second device. The device may correspond to the first device or the second device in the foregoing methods.

The device may include a processor 110 and a memory 120. The memory 120 is configured to store an instruction, and the processor 110 is configured to execute the instruction stored in the memory 120, so as to implement the steps and embodiments in the methods corresponding to FIG. 3 to FIG. 8.

Further, the device may further include an input port 140 and an output port 150. Further, the device may further include a bus system 130, where the processor 110, the memory 120, the input port 140, and the output port 150 may be connected by using the bus system 130.

The processor 110 is configured to execute the instruction stored in the memory 120, to control the input port 140 to receive a signal and control the output port 150 to send a signal, to complete the steps of the first device in the foregoing methods. The input port 140 and the output port 150 may be a same physical entity or different physical entities. When being the same physical entity, the input port 140 and the output port 150 may be collectively referred to as a transceiver. The memory 220 may be integrated into the processor 210, or may be separated from the processor 210.

In a possible implementation, functions of the input port 140 and the output port 150 may be implemented by using a transceiver circuit or a dedicated transceiver chip. The processor 110 may be implemented by using a dedicated processing chip, processing circuit, or processor, or a general-purpose chip.

In another implementation, it may be considered that the device provided in this embodiment of this application is implemented by using a general-purpose computer. To be specific, program code that implements functions of the processor 110, the input port 140, and the output port 150 is stored in the memory, and a general-purpose processor executes the code in the memory, to implement the functions of the processor 110, the input port 140, and the output port 150.

For concepts, explanations, detailed descriptions, and other steps related to the technical solutions provided in this embodiment of this application and related to the device, refer to related descriptions in the foregoing methods or other embodiments. Details are not described herein again.

Figure 12:
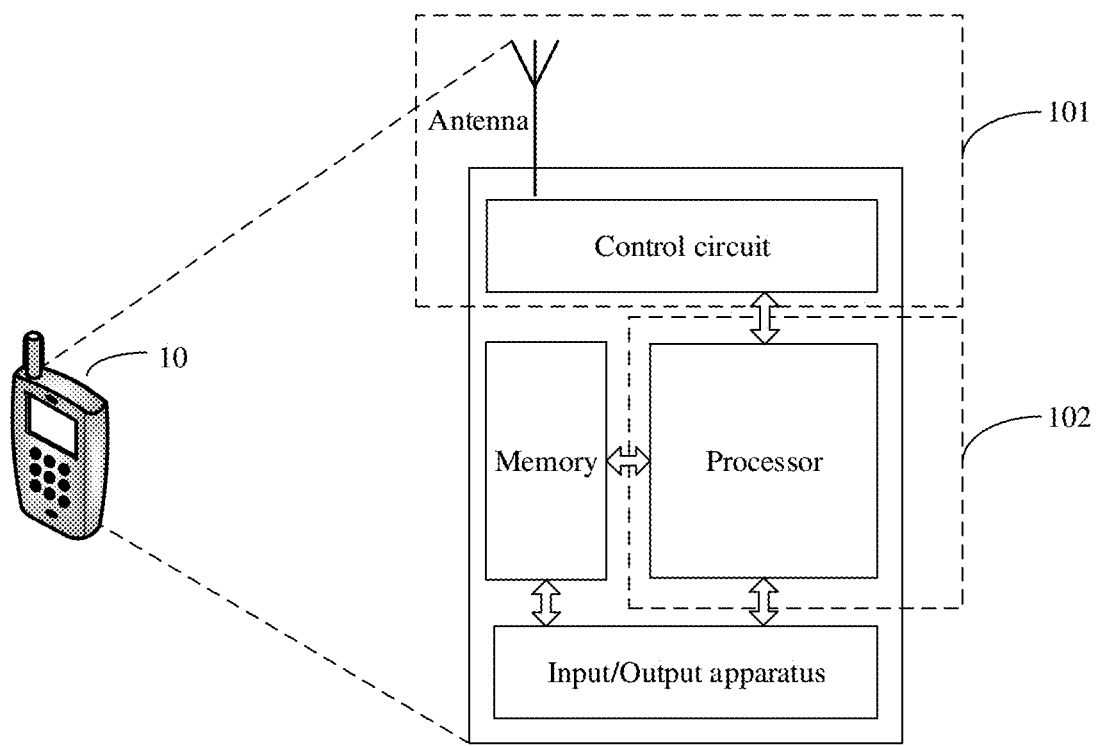
FIG. 12 is a schematic structural diagram of another device according to an embodiment of the present invention.

FIG. 12 is a schematic structural diagram of another device according to an embodiment of the present invention. The device is applicable to the system shown in FIG. 1. For ease of description, FIG. 12 shows only main components when the device is used as a terminal device. However, in this embodiment of the present invention, the device may alternatively be a base station or the like. As shown in FIG. 12, the terminal device includes a processor, a memory, a control circuit, an antenna, and an input/output apparatus. The processor is mainly configured to: process a communication protocol and communication data, control the entire terminal device, execute a software program, and process data of the software program, for example, is configured to support a first device or a second device in performing the actions described in the foregoing physical downlink control channel processing method embodiments. The memory is mainly configured to store the software program and the data, for example, store the first radio network temporary identifier, the second radio network temporary identifier, or the first identifier of the second device in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to receive and send a radio frequency signal in an electromagnetic wave form. The input/output apparatus such as a touchscreen, a display, or a keyboard is mainly configured to receive data entered by a user, and output data to the user.

After the terminal device is powered on, the processor may read a software program in a storage unit, explain and execute one or more instructions of the software program, and process data of the software program. When data needs to be sent in a wireless manner, the processor performs baseband processing on the to-be-sent data, and outputs a baseband signal to a radio frequency circuit. After the radio frequency circuit performs radio frequency processing on the baseband signal, a radio frequency signal is sent by using the antenna in an electromagnetic wave form. When data is sent to the terminal device, the radio frequency circuit receives a radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 12 shows only one memory and one processor. In actual user equipment, there may be a plurality of processors and a plurality of memories. The memory may also be referred to as a storage medium, a storage device, or the like. This is not limited in this embodiment of the present invention.

In an optional implementation, the processor may include a baseband processor and a central processing unit. The baseband processor is mainly configured to process the communication protocol and the communication data, and the central processing unit is mainly configured to: control the entire terminal device, execute the software program, and process the data of the software program. The processor in FIG. 12 integrates functions of the baseband processor and the central processing unit. A person skilled in the art may understand that the baseband processor and the central processing unit may be individually separate processors, and are interconnected by using a technology such as a bus. A person skilled in the art may understand that the user equipment may include a plurality of baseband processors to adapt to different network standards, the user equipment may include a plurality of central processing units to enhance a processing capability of the user equipment, and components of the user equipment may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in the storage unit in a form of a software program. The processor executes the software program to implement a baseband processing function.

For example, in this embodiment of the present invention, the antenna and the control circuit that have a transceiver function may be considered as a transceiver unit 101 of the user equipment, and a processor that has a processing function is considered as a processing unit 102 of the user equipment. As shown in FIG. 12, the user equipment includes a transceiver unit 101 and a processing unit 102. The transceiver unit may also be referred to as a transceiver, a transceiver, a transceiver apparatus, or the like. Optionally, a component in the transceiver unit 101 that is configured to implement a receiving function may be considered as a receiving unit, and a component in the transceiver unit 101 that is configured to implement a sending function may be considered as a sending unit. In other words, the transceiver unit 101 includes the receiving unit and the sending unit. For example, the receiving unit may also be referred to as a receiver, an input port, a receiver circuit, or the like, and the sending unit may be referred to as a transmitter, a transmitter, a transmitter circuit, or the like.

Figure 13:
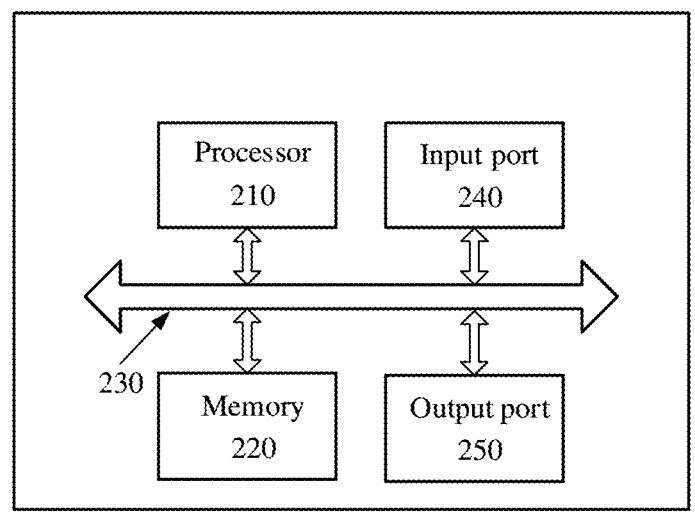
FIG. 13 is a schematic diagram 2 of a device according to an embodiment of the present invention.

According to the foregoing methods, FIG. 13 is a schematic diagram 2 of a device according to an embodiment of the present invention. As shown in FIG. 13, the device may be a network device 20, or may be a chip or a circuit, for example, a chip or a circuit that may be disposed inside the network device. The network device 20 corresponds to the network device in the foregoing methods. The device may include a processor 210 and a memory 220. The memory 220 is configured to store instructions, and the processor 210 is configured to execute the instructions stored in the memory 220, so that the device implements the foregoing methods corresponding to FIG. 3 to FIG. 8.

Further, the network may further include an input port 240 and an output port 250. Still further, the network may further include a bus system 230.

The processor 210, the memory 220, the input port 240, and the output port 250 are connected by using the bus system 230. The processor 210 is configured to execute the instruction stored in the memory 220, to control the input port 240 to receive a signal and control the output port 250 to send a signal, to complete the steps of the network device in the foregoing methods. The input port 240 and the output port 250 may be a same physical entity or different physical entities. When being the same physical entity, the input port 240 and the output port 250 may be collectively referred to as an input/output port. The memory 220 may be integrated into the processor 210, or may be separated from the processor 210.

In a possible implementation, functions of the input port 240 and the output port 250 may be implemented by using a transceiver circuit or a dedicated transceiver chip. The processor 210 may be implemented by using a dedicated processing chip, processing circuit, or processor, or a general-purpose chip.

In another implementation, it may be considered that the network device provided in this embodiment of this application is implemented by using a general-purpose computer. To be specific, program code that implements functions of the processor 210, the input port 240, and the output port 250 is stored in the memory, and a general-purpose processor executes the code in the memory, to implement the functions of the processor 210, the input port 240, and the output port 250.

For concepts, explanations, detailed descriptions, and other steps related to the technical solutions provided in this embodiment of this application and related to the device, refer to related descriptions in the foregoing methods or other embodiments. Details are not described herein again.

Figure 14:
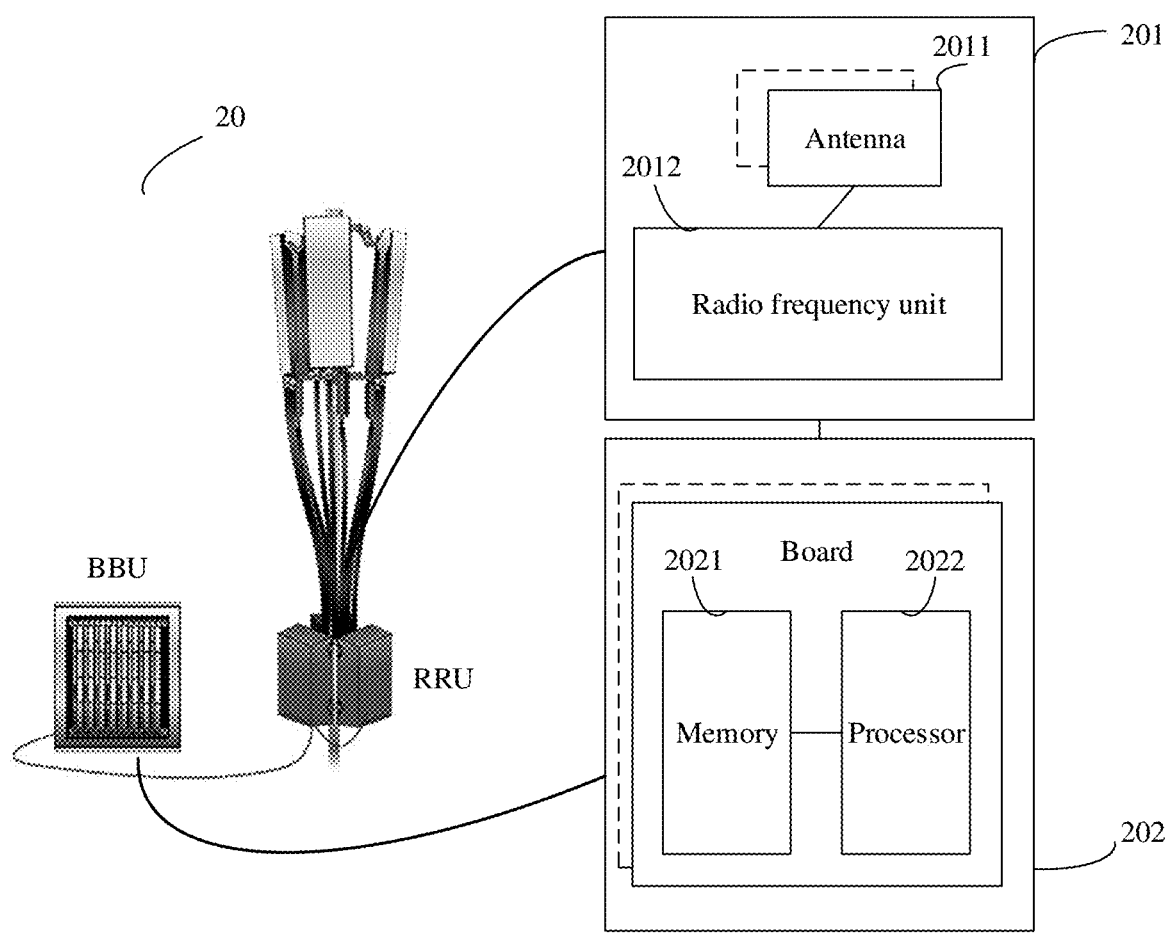
FIG. 14 is a schematic structural diagram of another network device according to an embodiment of the present invention.

According to the foregoing methods, FIG. 14 is a schematic structural diagram of another network device according to an embodiment of the present invention. For example, FIG. 14 may be a schematic structural diagram of a base station. As shown in FIG. 14, the base station may be applied to the system shown in FIG. 1. The base station 20 includes one or more radio frequency units such as remote radio units (RRU) 201 and one or more baseband units (BBU) (which may also be referred to as digital units, DU) 202. The RRU 201 may be referred to as a transceiver unit, a transceiver, a transceiver circuit, a transceiver, or the like, and may include at least one antenna 2011 and a radio frequency unit 2012. The RRU 201 is mainly configured to: send and receive radio frequency signals and perform conversion between a radio frequency signal and a baseband signal, for example, configured to send the signaling message in the foregoing embodiment to a terminal device. The BBU 202 is mainly configured to perform baseband processing, control the base station, and the like. The RRU 201 and the BBU 202 may be physically disposed together, or may be physically separated, in other words, in a distributed base station.

The BBU 202 is a control center of the base station, or may be referred to as a processing unit, and is mainly configured to complete baseband processing functions such as channel coding, multiplexing, modulation, and spectrum spreading. For example, the BBU (the processing unit) may be configured to control the base station to perform the operation procedure of the network device in the foregoing method embodiment.

In an example, the BBU 202 may include one or more boards, and a plurality of boards may jointly support a radio access network (such as an LTE network) of a single access standard, or may separately support radio access networks of different access standards. The BBU 202 further includes a memory 2021 and a processor 2022. The memory 2021 is configured to store necessary instructions and necessary data. For example, the memory 2021 stores the first radio network temporary identifier, the second radio network temporary identifier, the first identifier of the second device, or the like in the foregoing embodiment. The processor 2022 is configured to control the base station to perform a necessary action, for example, is configured to control the base station to perform an operation procedure related to the network device in the foregoing method embodiment. The memory 2021 and the processor 2022 may serve one or more boards. In other words, a memory and a processor may be separately disposed on each board. Alternatively, a plurality of boards may share a same memory and a same processor. In addition, each board may further be provided with a necessary circuit.

According to the methods provided in the embodiments of this application, an embodiment of this application further provides a communications system. The system includes the foregoing network device and one or more terminal devices.

It should be understood that in the embodiment of this application, the processor may be a central processing unit ("CPU" for short), or the processor may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory may include a read-only memory and a random access memory, and provide instructions and data for the processor. A part of the memory may further include a non volatile random access memory.

In addition to a data bus, the bus system may further include a power bus, a control bus, a status signal bus, and the like. However, for clear description, various types of buses in the figures are marked as the bus system.

In an implementation process, the steps in the foregoing methods may be completed using an integrated logic circuit of hardware in the processor, or using instructions in a form of software. The steps in the methods disclosed with reference to the embodiments of this application may be directly performed by a hardware processor, or may be performed by using a combination of hardware in the processor and a software module. The software module may be located in an existing storage medium in the art, such as a random access memory, a flash memory, a read-only memory, a programmable read-only memory, or an electrically erasable programmable memory. The storage medium is located in the memory, and the processor reads information from the memory and completes the steps in the foregoing methods in combination with hardware of the processor. To avoid repetition, details are not described herein.

It should further be understood that the numbers such as "first", "second", "third", and "fourth" included in this specification are merely for distinguishing purposes for ease of description, and are not intended to limit the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in various embodiments of this application, sequence numbers of the foregoing processes do not mean an execution sequence. The execution sequence of the processes should be determined based on functions and internal logic of the processes, and should not be construed as any limitation to the implementation process of the embodiments of the present invention.

A person of ordinary skill in the art may be aware that, in combination with illustrative logical blocks described in the embodiments disclosed in this specification and steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that such implementation goes beyond the scope of the present invention.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit.

All or some of the foregoing embodiments may be implemented by using software, hardware, firmware, or any combination thereof. When the software is used to implement the embodiments, the embodiments may be implemented completely or partially in a form of a computer program product. The computer program product includes one or more computer instructions. When the computer program instructions are loaded and executed on the computer, the processes or functions according to the embodiments of the present invention are completely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A physical downlink control channel processing method, comprising:
    determining a search space based on a first radio network temporary identifier, wherein the search space is a set of M candidate physical downlink control channels, and M is an integer greater than or equal to 1; and
    detecting a target physical downlink control channel from the search space based on a second radio network temporary identifier, wherein
    the first radio network temporary identifier is a radio network temporary identifier of a first device or a second device, the second device communicates with a network via the first device, the second radio network temporary identifier is the radio network temporary identifier of the second device, first downlink control information carried by the target physical downlink control channel is scrambled by using the second radio network temporary identifier, and the first downlink control information is used to schedule the second device.

2. The method according to claim 1, wherein the method further comprises:
    determining at least one candidate physical downlink control channel from the search space based on a first identifier of the second device; and
    the detecting a target physical downlink control channel from the search space based on a second radio network temporary identifier comprises:
    detecting the target physical downlink control channel from the at least one candidate physical downlink control channel based on the second radio network temporary identifier.

3. The method according to claim 2, wherein the determining at least one candidate physical downlink control channel from the search space based on a first identifier of the second device comprises:
    determining, from the search space, at least one candidate physical downlink control channel whose index satisfies the following formula:

$m \bmod n1 = (\text{identity} \bmod n1)$, wherein n1 is an integer and n1≤M; m is an index of each candidate physical downlink control channel in the search space, wherein, when M is equal to 1, m=0, and when M is larger than 1, m=0, 1, ..., M−1; the identity is the first identifier of the second device; and n1 is predefined, and is configured by the network device or determined by the first device.

4. The method according to claim 2, wherein
    the first identifier of the second device is the second radio network temporary identifier, an index of a second identifier of the second device in a target list reported by the first device, a local identifier of the second device, a proximity-services terminal identifier of the second device, or a layer 2 identifier of the second device; and
    the second identifier of the second device is the local identifier of the second device, the proximity-services terminal identifier of the second device, or the layer 2 identifier of the second device.

5. The method according to claim 1, wherein the method further comprises:
    determining at least one time unit based on a first identifier of the second device; and
    the determining a search space based on a first radio network temporary identifier comprises:
    determining the search space in the at least one time unit based on the first radio network temporary identifier.

6. The method according to claim 5, wherein the determining at least one time unit based on the first identifier of the second device comprises:
    determining, from a plurality of time units, at least one time unit whose index satisfies the following formula:

$i \bmod n2 = (\text{identity} \bmod n2)$, wherein n2 is an integer and n2≤N; i is an index of each of the plurality of time units, wherein i=0, 1, ..., N−1, and N is a quantity of the plurality of time units; the identity is the first identifier of the second device; and n2 is predefined, and is configured by the network device or determined by the first device.

7. The method according to claim 1, wherein the first radio network temporary identifier is a radio network temporary identifier used to scramble second downlink control information, and the second downlink control information is information used to schedule uplink transmission or downlink reception of the first device, or is information used to schedule sidelink transmission or sidelink reception of the first device.

8. The method according to claim 1, wherein a payload size of downlink control information carried by the target physical downlink control channel is equal to a payload size of downlink control information that is in the search space and that is used to schedule the first device.

9. A physical downlink control channel processing method, comprising:
   determining, by a network device, a search space based on a first radio network temporary identifier, wherein the search space is a set of M candidate physical downlink control channels, and M is an integer greater than or equal to 1; and
   sending, by the network device, a target physical downlink control channel in the search space based on a second radio network temporary identifier, wherein
   the first radio network temporary identifier is a radio network temporary identifier of a first device or a second device, the second device communicates with a network via the first device, first downlink control information carried by the target physical downlink control channel is scrambled by using the second radio network temporary identifier, the first downlink control information is used to schedule the second device, and the second radio network temporary identifier is the radio network temporary identifier of the second device.

10. The method according to claim 9, wherein the method further comprises:
    determining, by the network device, at least one candidate physical downlink control channel from the search space based on a first identifier of the second device; and
    the sending, by the network device, a target physical downlink control channel in the search space based on a second radio network temporary identifier comprises:
    sending, by the network device, the target physical downlink control channel on the at least one candidate physical downlink control channel based on the second radio network temporary identifier.

11. The method according to claim 10, wherein the determining, by the network device, at least one candidate physical downlink control channel from the search space based on a first identifier of the second device comprises:
    determining, by the network device from the search space, at least one candidate physical downlink control channel whose index satisfies the following formula:

$m \bmod n1 = (\text{identity} \bmod n1)$, wherein n1 is an integer and n1<M; m is an index of each candidate physical downlink control channel in the search space, wherein, when M is equal to 1, m=0, and when M is larger than 1, m=0, 1, ..., M−1; the identity is the first identifier of the second device; and n1 is predefined, and is configured by the network device or determined by the first device.

12. The method according to claim 10, wherein
    the first identifier of the second device is the second radio network temporary identifier, an index of a second identifier of the second device in a target list reported by the first device, a local identifier of the second device, a proximity-services terminal identifier of the second device, or a layer 2 identifier of the second device; and
    the second identifier of the second device is the local identifier of the second device, the proximity-services terminal identifier of the second device, or the layer 2 identifier of the second device.

13. The method according to claim 9, wherein the method further comprises:
    determining, by the network device, at least one time unit based on a first identifier of the second device; and
    the determining, by a network device, a search space based on a first radio network temporary identifier comprises:
    determining, by the network device, the search space in the at least one time unit based on the first radio network temporary identifier.

14. The method according to claim 13, wherein the determining, by the network device, at least one time unit based on the first identifier of the second device comprises:
    determining, by the network device from a plurality of time units, at least one time unit whose index satisfies the following formula:

$i \bmod n2 = (\text{identity} \bmod n2)$, wherein n2 is an integer and n2≤N; i is an index of each of the plurality of time units, wherein i=0, 1, ..., N−1, and N is a quantity of the plurality of time units; the identity is the first identifier of the second device; and n2 is predefined, and is configured by the network device or determined by the first device.

15. The method according to claim 9, wherein the first radio network temporary identifier is a radio network temporary identifier used to scramble second downlink control information, and the second downlink control information is information used to schedule uplink transmission or downlink reception of the first device, or is information used to schedule sidelink transmission or sidelink reception of the first device.

16. The method according to claim 9, wherein a payload size of t e downlink control information carried by the target physical downlink control channel is equal to a payload size of downlink control information that is in the search space and that is used to schedule the first device.

17. A device, comprising a processor, a memory, and a transceiver, wherein
    the memory stores instructions, that when executed by the processor, enable the processor to perform the method according to claim 1.

18. A network device, comprising at least one processor, a memory, and a transceiver, wherein
    the memory stores instructions, that executed by the at least one processor, enable the at least one processor to perform the method according to claim 9.

19. A non-transitory computer readable storage medium storing computer software instructions, that when executed by a device, enable the device to perform the method according to claim 1.

20. A non-transitory computer readable storage medium storing computer software instructions, that when executed by a network device, enable the network device perform the method according to claim 9.

* * * * *

UNITED STATES PATENT AND TRADEMARK OFFICE
CERTIFICATE OF CORRECTION

PATENT NO. : 11,337,200 B2
APPLICATION NO. : 16/651603
DATED : May 17, 2022
INVENTOR(S) : Yu Cai et al.

It is certified that error appears in the above-identified patent and that said Letters Patent is hereby corrected as shown below:

In the Claims

Claim 16, at Column 48, Line 42, replace "oft e" with "of".

Signed and Sealed this
Twenty-eighth Day of June, 2022

Katherine Kelly Vidal
*Director of the United States Patent and Trademark Office*